(12) United States Patent
Abotabl et al.

(10) Patent No.: US 12,513,698 B2
(45) Date of Patent: Dec. 30, 2025

(54) ASSISTIVE PERIODIC RESOURCES FOR RELIABLE AND LOW-LATENCY UPLINK COMMUNICATION

(71) Applicant: QUALCOMM Incorporated, San Diego, CA (US)

(72) Inventors: Ahmed Attia Abotabl, San Diego, CA (US); Marwen Zorgui, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 18/165,829

(22) Filed: Feb. 7, 2023

(65) Prior Publication Data
US 2024/0267920 A1    Aug. 8, 2024

(51) Int. Cl.
*H04W 72/20* (2023.01)
*H04W 72/0446* (2023.01)
*H04W 72/0453* (2023.01)

(52) U.S. Cl.
CPC ....... *H04W 72/20* (2023.01); *H04W 72/0446* (2013.01); *H04W 72/0453* (2013.01)

(58) Field of Classification Search
CPC ......... H04W 72/0446; H04W 72/0453; H04W 72/20
USPC .......................................................... 370/329
See application file for complete search history.

(56) References Cited

U.S. PATENT DOCUMENTS

| | | | |
|---|---|---|---|
| 2019/0075563 A1* | 3/2019 | Babaei | H04L 5/0094 |
| 2020/0275485 A1* | 8/2020 | Babaei | H04W 74/006 |
| 2022/0224443 A1* | 7/2022 | Lee | H04W 72/23 |
| 2023/0015915 A1* | 1/2023 | Zhang | H04W 72/02 |
| 2023/0353208 A1* | 11/2023 | Katla | H04B 7/0695 |
| 2023/0421303 A1* | 12/2023 | Elshafie | H04L 1/1816 |
| 2024/0306151 A1* | 9/2024 | Kuang | H04L 5/0053 |

* cited by examiner

*Primary Examiner* — Robert J Lopata
(74) *Attorney, Agent, or Firm* — Holland & Hart LLP

(57) ABSTRACT

Methods, systems, and devices for wireless communications are described. In some systems, a user equipment (UE) may proactively provide assistive (e.g., redundant) information associated with a set of data messages transmitted via a set of periodic resources, which may reduce an amount of (or obviate the use of) retransmission indications from the network entity. For example, the UE and the network entity may support a first set of periodic resources for transmission of data messages and a second set of periodic resources for transmission of assistive information associated with the data messages. The second set of periodic resources may be a subset of the first set of periodic resources or may be different from the first set of periodic resources, and may be designated or indicated as assistive of the first set of periodic resources via control signaling or an activation downlink control information (DCI).

25 Claims, 15 Drawing Sheets

ASSISTIVE PERIODIC RESOURCES FOR RELIABLE AND LOW-LATENCY UPLINK COMMUNICATION

FIELD OF TECHNOLOGY

The following relates to wireless communications, including assistive periodic resources for reliable and low-latency uplink communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support assistive periodic resources for reliable and low-latency uplink communication. For example, the described techniques provide for static configurations or dynamic indications of assistive periodic resources that a user equipment (UE) may use to provide assistive (e.g., redundant) information to a receiving device. For example, the UE may transmit a set of data messages to a network entity via transmission occasions of a first set of periodic resources and may transmit assistive information associated with the set of data messages via a transmission occasion of a second set of periodic resources. Accordingly, the second set of periodic resources may be understood as being assistive of the first set of periodic resources. The second set of periodic resources may be a subset of the first set of periodic resources or may be different from the first set of periodic resources. Further, the second set of periodic resources may be designated (e.g., indicated, identified, determined, or selected) as assistive of the first set of periodic resources statically, semi-persistently, or dynamically.

A method for wireless communication at a UE is described. The method may include receiving control signaling that includes first information associated with a first set of periodic resources and second information associated with a second set of periodic resources, transmitting a set of multiple data messages via a set of transmission occasions associated with the first set of periodic resources, where a respective data message of the set of multiple data messages is transmitted via a respective transmission occasion of the set of transmission occasions, and transmitting assistive information associated with the set of multiple data messages via a transmission occasion associated with the second set of periodic resources, where the transmission occasion associated with the second set of periodic resources is designated for the assistive information associated with the set of multiple data messages.

An apparatus for wireless communication at a UE is described. The apparatus may include a processor, memory coupled with the processor, and instructions stored in the memory. The instructions may be executable by the processor to cause the apparatus to receive control signaling that includes first information associated with a first set of periodic resources and second information associated with a second set of periodic resources, transmit a set of multiple data messages via a set of transmission occasions associated with the first set of periodic resources, where a respective data message of the set of multiple data messages is transmitted via a respective transmission occasion of the set of transmission occasions, and transmit assistive information associated with the set of multiple data messages via a transmission occasion associated with the second set of periodic resources, where the transmission occasion associated with the second set of periodic resources is designated for the assistive information associated with the set of multiple data messages.

Another apparatus for wireless communication at a UE is described. The apparatus may include means for receiving control signaling that includes first information associated with a first set of periodic resources and second information associated with a second set of periodic resources, means for transmitting a set of multiple data messages via a set of transmission occasions associated with the first set of periodic resources, where a respective data message of the set of multiple data messages is transmitted via a respective transmission occasion of the set of transmission occasions, and means for transmitting assistive information associated with the set of multiple data messages via a transmission occasion associated with the second set of periodic resources, where the transmission occasion associated with the second set of periodic resources is designated for the assistive information associated with the set of multiple data messages.

A non-transitory computer-readable medium storing code for wireless communication at a UE is described. The code may include instructions executable by a processor to receive control signaling that includes first information associated with a first set of periodic resources and second information associated with a second set of periodic resources, transmit a set of multiple data messages via a set of transmission occasions associated with the first set of periodic resources, where a respective data message of the set of multiple data messages is transmitted via a respective transmission occasion of the set of transmission occasions, and transmit assistive information associated with the set of multiple data messages via a transmission occasion associated with the second set of periodic resources, where the transmission occasion associated with the second set of periodic resources is designated for the assistive information associated with the set of multiple data messages.

In some examples of the method, apparatuses, and non-transitory computer-readable medium described herein, receiving the control signaling may include operations, features, means, or instructions for receiving, via the first information, indications of time and frequency resources and a first periodicity associated with the first set of periodic resources and receiving, via the second information, indications of a second periodicity and an offset associated with the second set of periodic resources, where the second periodicity may be a multiple of the first periodicity and the offset may be relative to an initial transmission occasion associated with the first set of periodic resources, and where the second set of periodic resources may be a subset of the first set of periodic resources.

In some examples of the method, apparatuses, and non-transitory computer-readable medium described herein, receiving the control signaling may include operations, features, means, or instructions for receiving, via the first information, indications of first time and frequency resources and a first periodicity associated with the first set of periodic resources and receiving, via the second information, indications of second time and frequency resources and a second periodicity associated with the second set of periodic resources, where the second set of periodic resources may be different from the first set of periodic resources.

In some examples of the method, apparatuses, and non-transitory computer-readable medium described herein, receiving the control signaling may include operations, features, means, or instructions for receiving, via the second information, an indication that the second set of periodic resources may be designated as assistive of the first set of periodic resources, where transmitting the assistive information may be based on the indication.

Some examples of the method, apparatuses, and non-transitory computer-readable medium described herein may further include operations, features, means, or instructions for receiving a downlink control information (DCI) message activating the second set of periodic resources, where the DCI message includes an indication that the second set of periodic resources may be designated as assistive of the first set of periodic resources, where transmitting the assistive information may be based on the indication.

Some examples of the method, apparatuses, and non-transitory computer-readable medium described herein may further include operations, features, means, or instructions for transmitting a second set of multiple data messages via a second set of transmission occasions associated with the first set of periodic resources, receiving a DCI message including an indication that a second transmission occasion associated with the first set of periodic resources may be designated for second assistive information associated with the second set of multiple data messages, and transmitting the second assistive information via the second transmission occasion based on the second transmission occasion being designated for the second assistive information.

In some examples of the method, apparatuses, and non-transitory computer-readable medium described herein, transmitting the set of multiple data messages via the set of transmission occasions associated with the first set of periodic resources may include operations, features, means, or instructions for transmitting a first data message containing all zero bits via a first transmission occasion of the set of transmission occasions based on a lack of new data to be sent via the first transmission occasion and in accordance with the transmission occasion associated with the second set of periodic resources being designated for the assistive information associated with the set of multiple data messages, where the assistive information may be based on the first data message containing all zero bits.

Some examples of the method, apparatuses, and non-transitory computer-readable medium described herein may further include operations, features, means, or instructions for transmitting an uplink control information message including an indication that a first transmission occasion associated with the first set of periodic resources may be skipped based on a lack of new data to be sent via the first transmission occasion and in accordance with the transmission occasion associated with the second set of periodic resources being designated for the assistive information.

Some examples of the method, apparatuses, and non-transitory computer-readable medium described herein may further include operations, features, means, or instructions for transmitting second assistive information associated with a second set of multiple data messages via a first transmission occasion associated with the first set of periodic resources, where the first transmission occasion may be used for the second assistive information based on a lack of new data to be sent via the first transmission occasion.

Some examples of the method, apparatuses, and non-transitory computer-readable medium described herein may further include operations, features, means, or instructions for receiving third information associated with a third set of periodic resources, transmitting a second set of multiple data messages via a second set of transmission occasions associated with the third set of periodic resources, and transmitting second assistive information associated with the second set of multiple data messages via the transmission occasion associated with the second set of periodic resources, where the transmission occasion may be designated for the assistive information associated with the set of multiple data messages and the second assistive information associated with the second set of multiple data messages.

Some examples of the method, apparatuses, and non-transitory computer-readable medium described herein may further include operations, features, means, or instructions for receiving third information associated with a third set of periodic resources, transmitting a second set of multiple data messages via a second set of transmission occasions associated with the first set of periodic resources, transmitting second assistive information associated with the second set of multiple data messages via a second transmission occasion associated with the second set of periodic resources, and transmitting third assistive information associated with the assistive information and the second assistive information via a third transmission occasion associated with the third set of periodic resources, where the third transmission occasion may be designated for the third assistive information associated with the assistive information and the second assistive information.

In some examples of the method, apparatuses, and non-transitory computer-readable medium described herein, the assistive information associated with the set of multiple data messages may be based on a bitwise operator on the set of multiple data messages, the assistive information may include redundant information associated with the set of multiple data messages in accordance with the bitwise operator on the set of multiple data messages, and an indication of a quantity of the set of multiple data messages may be included in the control signaling.

In some examples of the method, apparatuses, and non-transitory computer-readable medium described herein, a periodicity associated with the second set of periodic resources may be based on a block error rate of uplink communication from the UE.

In some examples of the method, apparatuses, and non-transitory computer-readable medium described herein, an activation of the second set of periodic resources as assistive of the first set of periodic resources may be associated with a switch to a network energy saving mode and transmitting the assistive information associated with the set of multiple data messages via the transmission occasion associated with the second set of periodic resources may be based on the activation of the second set of periodic resources as assistive of the first set of periodic resources.

A method for wireless communication at a network entity is described. The method may include transmitting control signaling that includes first information associated with a first set of periodic resources and second information associated with a second set of periodic resources, receiving a set of multiple data messages via a set of transmission occasions associated with the first set of periodic resources, where a respective data message of the set of multiple data messages is received via a respective transmission occasion of the set of transmission occasions, and receiving assistive information associated with the set of multiple data messages via a transmission occasion associated with the second set of periodic resources, where the transmission occasion associated with the second set of periodic resources is designated for the assistive information associated with the set of multiple data messages.

An apparatus for wireless communication at a network entity is described. The apparatus may include a processor, memory coupled with the processor, and instructions stored in the memory. The instructions may be executable by the processor to cause the apparatus to transmit control signaling that includes first information associated with a first set of periodic resources and second information associated with a second set of periodic resources, receive a set of multiple data messages via a set of transmission occasions associated with the first set of periodic resources, where a respective data message of the set of multiple data messages is received via a respective transmission occasion of the set of transmission occasions, and receive assistive information associated with the set of multiple data messages via a transmission occasion associated with the second set of periodic resources, where the transmission occasion associated with the second set of periodic resources is designated for the assistive information associated with the set of multiple data messages.

Another apparatus for wireless communication at a network entity is described. The apparatus may include means for transmitting control signaling that includes first information associated with a first set of periodic resources and second information associated with a second set of periodic resources, means for receiving a set of multiple data messages via a set of transmission occasions associated with the first set of periodic resources, where a respective data message of the set of multiple data messages is received via a respective transmission occasion of the set of transmission occasions, and means for receiving assistive information associated with the set of multiple data messages via a transmission occasion associated with the second set of periodic resources, where the transmission occasion associated with the second set of periodic resources is designated for the assistive information associated with the set of multiple data messages.

A non-transitory computer-readable medium storing code for wireless communication at a network entity is described. The code may include instructions executable by a processor to transmit control signaling that includes first information associated with a first set of periodic resources and second information associated with a second set of periodic resources, receive a set of multiple data messages via a set of transmission occasions associated with the first set of periodic resources, where a respective data message of the set of multiple data messages is received via a respective transmission occasion of the set of transmission occasions, and receive assistive information associated with the set of multiple data messages via a transmission occasion associated with the second set of periodic resources, where the transmission occasion associated with the second set of periodic resources is designated for the assistive information associated with the set of multiple data messages.

In some examples of the method, apparatuses, and non-transitory computer-readable medium described herein, transmitting the control signaling may include operations, features, means, or instructions for transmitting, via the first information, indications of time and frequency resources and a first periodicity associated with the first set of periodic resources and transmitting, via the second information, indications of a second periodicity and an offset associated with the second set of periodic resources, where the second periodicity may be a multiple of the first periodicity and the offset may be relative to an initial transmission occasion associated with the first set of periodic resources, and where the second set of periodic resources may be a subset of the first set of periodic resources.

In some examples of the method, apparatuses, and non-transitory computer-readable medium described herein, transmitting the control signaling may include operations, features, means, or instructions for transmitting, via the first information, indications of first time and frequency resources and a first periodicity associated with the first set of periodic resources and transmitting, via the second information, indications of second time and frequency resources and a second periodicity associated with the second set of periodic resources, where the second set of periodic resources may be different from the first set of periodic resources.

In some examples of the method, apparatuses, and non-transitory computer-readable medium described herein, transmitting the control signaling may include operations, features, means, or instructions for transmitting, via the second information, an indication that the second set of periodic resources may be designated as assistive of the first set of periodic resources, where receiving the assistive information may be based on the indication.

Some examples of the method, apparatuses, and non-transitory computer-readable medium described herein may further include operations, features, means, or instructions for transmitting a DCI message activating the second set of periodic resources, where the DCI message includes an indication that the second set of periodic resources may be designated as assistive of the first set of periodic resources, where receiving the assistive information may be based on the indication.

Some examples of the method, apparatuses, and non-transitory computer-readable medium described herein may further include operations, features, means, or instructions for receiving a second set of multiple data messages via a second set of transmission occasions associated with the first set of periodic resources, transmitting a DCI message including an indication that a second transmission occasion associated with the first set of periodic resources may be designated for second assistive information associated with the second set of multiple data messages, and receiving the second assistive information via the second transmission occasion based on the second transmission occasion being designated for the second assistive information.

In some examples of the method, apparatuses, and non-transitory computer-readable medium described herein, receiving the set of multiple data messages via the set of transmission occasions associated with the first set of periodic resources may include operations, features, means, or instructions for receiving a first data message containing all zero bits via a first transmission occasion of the set of transmission occasions based on a lack of new data to be sent via the first transmission occasion and in accordance with the transmission occasion associated with the second set of periodic resources being designated for the assistive information associated with the set of multiple data messages, where the assistive information may be based on the first data message containing all zero bits.

Some examples of the method, apparatuses, and non-transitory computer-readable medium described herein may further include operations, features, means, or instructions for receiving an uplink control information message including an indication that a first transmission occasion associated with the first set of periodic resources may be skipped based on a lack of new data to be sent via the first transmission occasion and in accordance with the transmission occasion associated with the second set of periodic resources being designated for the assistive information.

Some examples of the method, apparatuses, and non-transitory computer-readable medium described herein may further include operations, features, means, or instructions for receiving second assistive information associated with a second set of multiple data messages via a first transmission occasion associated with the first set of periodic resources, where the first transmission occasion may be used for the second assistive information based on a lack of new data to be sent via the first transmission occasion.

Some examples of the method, apparatuses, and non-transitory computer-readable medium described herein may further include operations, features, means, or instructions for transmitting third information associated with a third set of periodic resources, receiving a second set of multiple data messages via a second set of transmission occasions associated with the third set of periodic resources, and receiving second assistive information associated with the second set of multiple data messages via the transmission occasion associated with the second set of periodic resources, where the transmission occasion may be designated for the assistive information associated with the set of multiple data messages and the second assistive information associated with the second set of multiple data messages.

Some examples of the method, apparatuses, and non-transitory computer-readable medium described herein may further include operations, features, means, or instructions for transmitting third information associated with a third set of periodic resources, receiving a second set of multiple data messages via a second set of transmission occasions associated with the first set of periodic resources, receiving second assistive information associated with the second set of multiple data messages via a second transmission occasion associated with the second set of periodic resources, and receiving third assistive information associated with the assistive information and the second assistive information via a third transmission occasion associated with the third set of periodic resources, where the third transmission occasion may be designated for the third assistive information associated with the assistive information and the second assistive information.

In some examples of the method, apparatuses, and non-transitory computer-readable medium described herein, the assistive information associated with the set of multiple data messages may be based on a bitwise operator on the set of multiple data messages, the assistive information may include redundant information associated with the set of multiple data messages in accordance with the bitwise operator on the set of multiple data messages, and an indication of a quantity of the set of multiple data messages may be included in the control signaling.

In some examples of the method, apparatuses, and non-transitory computer-readable medium described herein, a periodicity associated with the second set of periodic resources may be based on a block error rate of uplink communication from a UE.

In some examples of the method, apparatuses, and non-transitory computer-readable medium described herein, an activation of the second set of periodic resources as assistive of the first set of periodic resources may be associated with a switch to a network energy saving mode and receiving the assistive information associated with the set of multiple data messages via the transmission occasion associated with the second set of periodic resources may be based on the activation of the second set of periodic resources as assistive of the first set of periodic resources.

DETAILED DESCRIPTION

Figure 1:
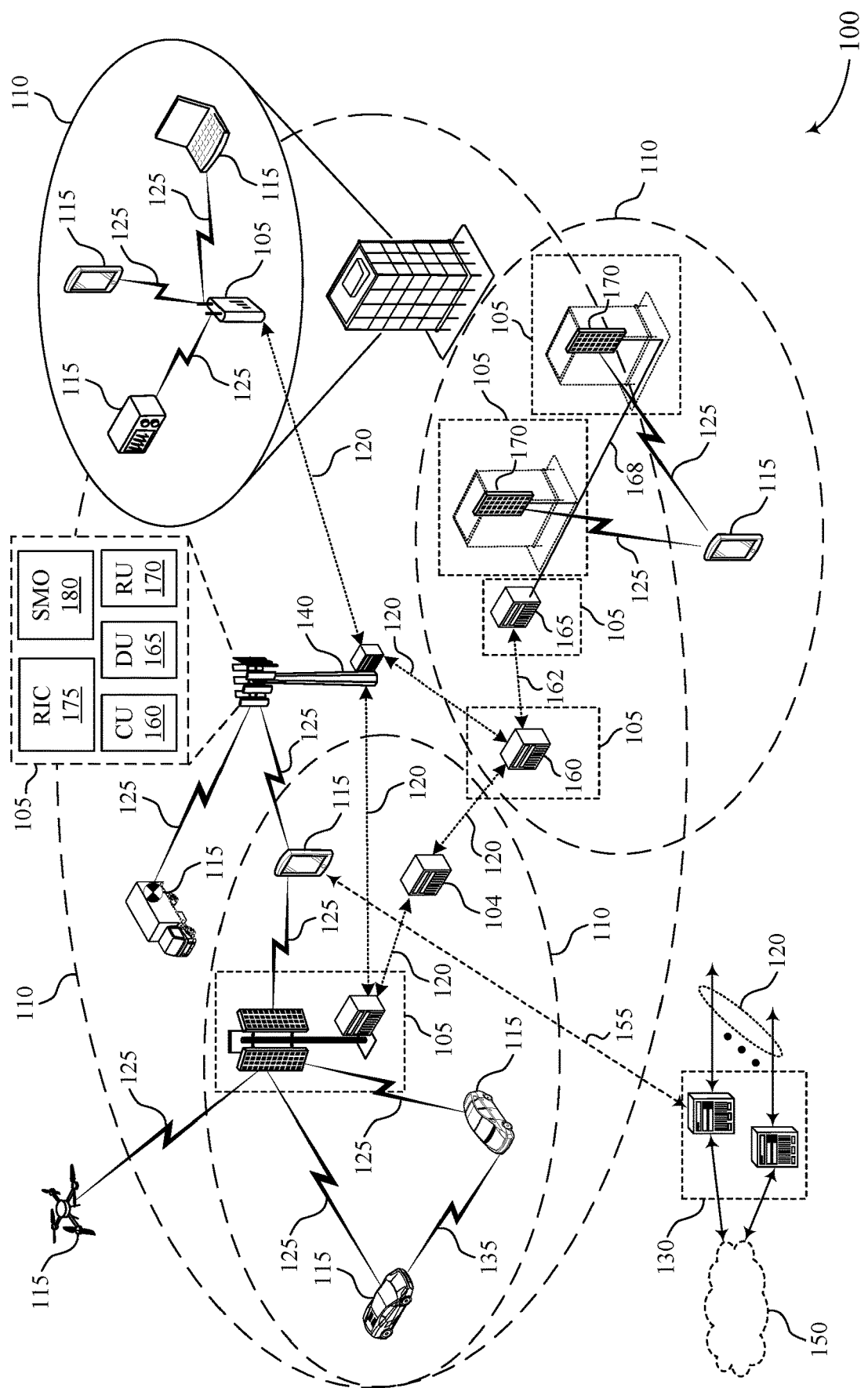
FIG. 1 illustrates an example of a wireless communications system that supports assistive periodic resources for reliable and low-latency uplink communication in accordance with one or more aspects of the present disclosure.

In some wireless communications systems, a network entity may configure a user equipment (UE) with one or more sets of periodic resources to reduce a decoding burden at the UE or to more efficiently support low-latency applications, where a set of periodic resources may be associated with a configured grant (CG)-based resource allocation or a semi-persistently scheduling (SPS)-based resource allocation. For example, without downlink control information (DCI)-based scheduling, the UE may transmit data messages via transmission occasions associated with a set of periodic resources while the set of periodic resources is activated or configured. As the UE transmits the data messages, the network entity may attempt to receive and decode the data messages via the transmission occasions associated with the set of periodic resources. If the network entity fails to successfully receive and decode a data message, the network entity may transmit a retransmission indication to the UE requesting the UE to retransmit the data message. In some deployments, such as deployments in which the network entity employs network energy saving (NES) modes or otherwise enters sleep cycles to reduce network energy consumption, such a retransmission indication from the network entity may break a sleep cycle of the network entity and prevent some energy savings.

In some implementations, a UE and a network entity may support assistive transmission occasions that the UE may use to proactively provide redundant information associated with a set of data messages (e.g., a set of recently transmitted data messages) transmitted via a set of periodic resources, which may reduce an amount of (or obviate the use of) retransmission indications from the network entity. For example, the UE and the network entity may support (e.g., configure, activate, use, employ, etc.) a first set of periodic resources for transmissions of data messages and a second set of periodic resources for transmissions of assistive (e.g., redundant) information associated with the data messages. In other words, the UE may transmit a set of data messages via a set of transmission occasions associated with the first set of periodic resources and may transmit assistive information associated with the set of data messages via a transmission occasion associated with the second set of periodic resources. As described herein, the second set of periodic resources may be understood as being "assistive of" the first set of periodic resources based on transmission occasions of the second set of periodic resources being used for transmitting information that is redundant to information transmitted via transmission occasions of the first set of periodic resources, as opposed to (or in addition to) being used for transmitting new or fresh data.

Such assistive information may include a set of bits that are calculated (e.g., identified, computed, selected, or otherwise determined) based on a bitwise operator applied to the set of data messages. As such, the assistive information provided by the UE may enable the network entity to derive the information bits included in each of the set of data messages and to identify and fix any reception errors associated with the set of data messages (without transmitting a retransmission indication to the UE). The network entity may indicate that the second set of periodic resources are assistive of the first set of periodic resources via various types of signaling, such as via radio resource control (RRC) signaling, a medium access control (MAC) control element (CE), or DCI.

Particular aspects of the subject matter described in this disclosure can be implemented to realize one or more of the following potential advantages. In some examples, by proactively and periodically transmitting assistive information to the network entity when transmitting new data via a set of periodic resources, the UE may enable the network entity to refrain from transmitting a retransmission indication for any data messages the network entity initially fails to decode. For example, as described herein, the network entity may instead use the assistive information provided via the second set of periodic resources to verify or correct each of the set of data messages received via the first set of periodic resources. In accordance with refraining from transmitting a retransmission indication, the network entity may avoid breaking a sleep cycle and achieve greater network energy savings. Further, such transmissions of redundant information may improve the reliability and accuracy of communication between the UE and the network entity and reduce latency. Moreover, as a result of improved reliability and accuracy of communication between the UE and the network entity, the UE and the network entity may experience greater uplink coverage. As such, the UE and the network entity may also achieve or experience higher data rates, greater spectral efficiency, and greater system capacity.

Additionally, the UE or the network entity, or both, may support a decision-making mechanism according to which the UE or the network entity, or both, evaluate a tradeoff between resource overhead and network energy savings. For example, while use of an assistive set of periodic resources may be associated with a resource overhead, the UE or the network entity may evaluate whether the resource overhead cost is worth the network energy savings that the network entity may experience by refraining from transmitting a retransmission indication. For example, the network entity may determine or identify that, in an application or deployment associated with potential network energy savings, a relatively small quantity of UEs are being served and time and frequency resources are not a bottleneck for the system. In such examples, the network entity may determine to configure or activate an assistive set of periodic resources to leverage available communication resources for greater network energy savings.

Aspects of the disclosure are initially described in the context of a wireless communications system. Aspects of the disclosure are additionally illustrated by and described with reference to communication timelines and a process flow. Aspects of the disclosure are further illustrated by and described with reference to apparatus diagrams, system diagrams, and flowcharts that relate to assistive periodic resources for reliable and low-latency uplink communication.

FIG. 1 illustrates an example of a wireless communications system 100 that supports assistive periodic resources for reliable and low-latency uplink communication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125

(e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support assistive periodic resources for reliable and low-latency uplink communication as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval. HARQ feedback may include acknowledgment (ACK) feedback or negative acknowledgment (NACK) feedback and may be equivalently referred to as HARQ-ACK feedback.

The UEs 115 and the network entities 105 may support CGs, which may be defined by or associated with time and frequency resources, a periodicity, and a repetition level, among other configurations. Example configurations or parameters associated with a CG (e.g., a ConfiguredGrant-Config) may include a frequencyHopping parameter, a cg- DMRS-Configuration parameter, an mcs-Table parameter, an mcs-TableTransformPrecoder parameter, a uci-OnPUSCH parameter, a resourceAllocation parameter, an rbg-Size parameter, a powerControlLoopToUse parameter, a p0-PUSCH-Alpha parameter, a transformPrecoder parameter, an nrofHARQ-Processes parameter, a repK parameter, and a periodicity parameter. A CG may be one of two types. For example, a first type of CG may be used by UEs 115 and network entities 105 without DCI activation while a second type of CG may be used by UEs 115 and network entities 105 after DCI activation. In some systems, a network entity 105 may configure a UE 115 with up two 12 uplink CGs.

In some wireless communications systems, such as the wireless communications system 100, a network entity 105 may configure a UE 115 with one or more sets of periodic resources to reduce a decoding burden at the UE 115 or to more efficiently support low-latency applications, where a set of periodic resources may be associated with a CG-based resource allocation or an SPS-based resource allocation. For example, without DCI-based scheduling, the UE 115 may transmit uplink data messages via transmission occasions associated with a set of periodic resources while the set of periodic resources is activated or configured. While the UE 115 transmits the uplink data messages, the network entity 105 may attempt to receive and decode the uplink data messages via the transmission occasions associated with the set of periodic resources.

If the network entity 105 fails to successfully receive and decode an uplink data message via a transmission occasion, the network entity 105 may transmit a retransmission indication to the UE 115 requesting the UE 115 to retransmit the uplink data message. In some deployments, such as deployments in which the network entity 105 employs NES modes or otherwise enters sleep cycles to reduce network energy consumption, such a retransmission indication from the network entity 105 may break a sleep cycle of the network entity 105 and prevent some energy savings.

In some implementations, a UE 115 and a network entity 105 may support multiple sets of periodic resources, where at least one set of periodic resources is assistive of one or more other sets of periodic resources. For example, the UE 115 and the network entity 105 may support assistive transmission occasions that the UE 115 may use to proactively provide assistive (e.g., redundant) information associated with a set of data messages (e.g., a set of recently transmitted data messages) transmitted via a set of periodic resources, which may reduce an amount of (or obviate the use of) retransmission indications from the network entity 105. As an example, the UE 115 and the network entity 105 may support (e.g., configure, activate, use, employ, etc.) a first set of periodic resources for transmission of data messages and a second set of periodic resources for transmission of redundant information associated with the data messages (such that the second set of periodic resources is assistive of the first set of periodic resources).

In other words, the UE 115 may transmit a set of data messages via a set of transmission occasions associated with the first set of periodic resources and may transmit redundant information associated with the set of data messages via a transmission occasion associated with the second set of periodic resources. As described herein, the second set of periodic resources may be understood as being "assistive of" the first set of periodic resources based on transmission occasions of the second set of periodic resources being used for transmitting information that is redundant to information transmitted via transmission occasions of the first set of periodic resources, as opposed to (or in addition to) being used for transmitting new or fresh data. The second set of periodic resources may be a subset of the first set of periodic resources or may be separate from the first set of periodic resources.

Figure 2:
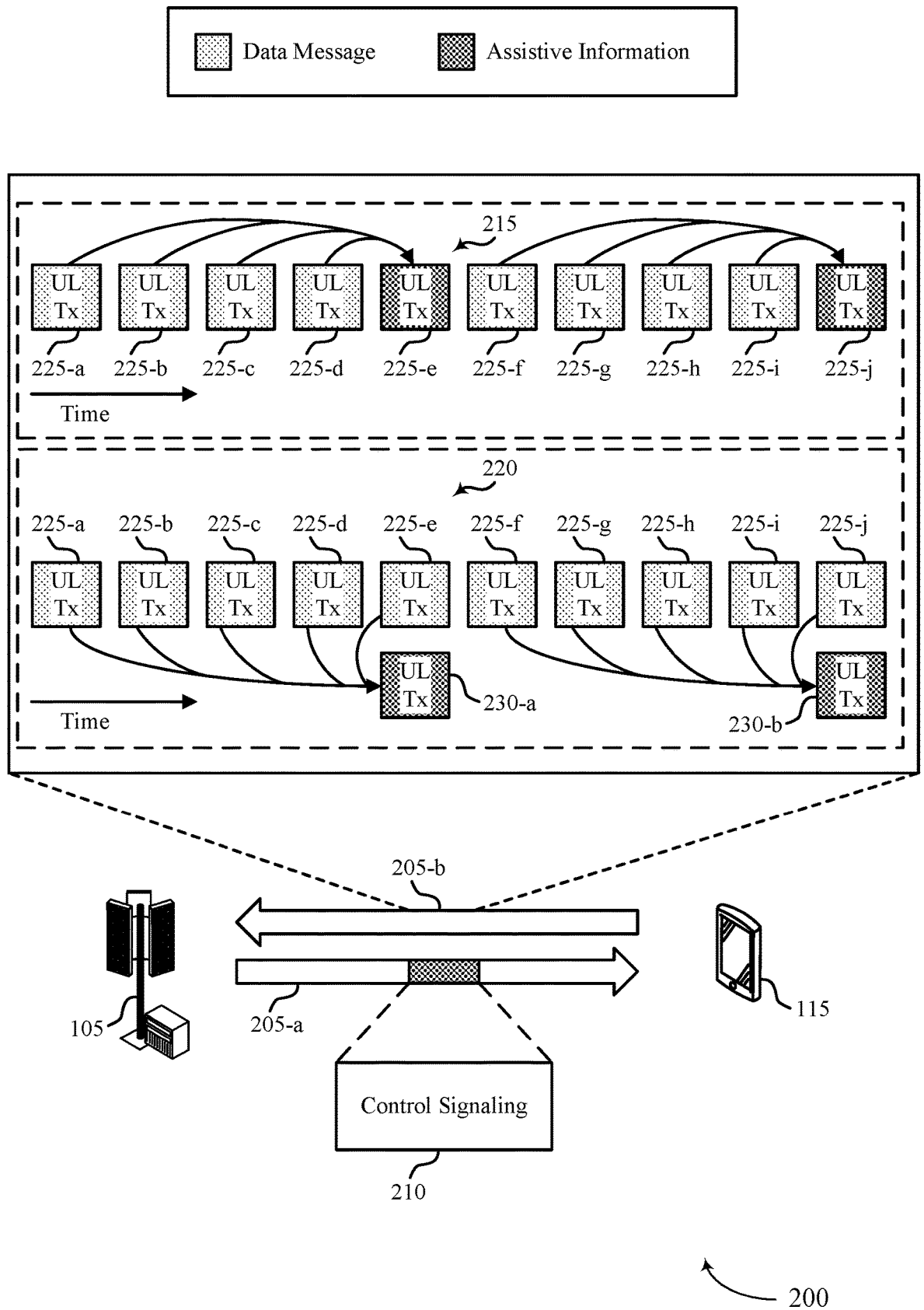
FIG. 2 illustrates an example of a signaling diagram that supports assistive periodic resources for reliable and low-latency uplink communication in accordance with one or more aspects of the present disclosure.

FIG. 2 illustrates an example of a signaling diagram 200 that supports assistive periodic resources for reliable and low-latency uplink communication in accordance with one or more aspects of the present disclosure. The signaling diagram 200 illustrates communication between a UE 115 and a network entity 105. For example, the network entity 105 may transmit downlink signaling to the UE 115 via a communication link 205-*a* and the UE 115 may transmit uplink signaling to the network entity 105 via a communication link 205-*b*. In some implementations, the UE 115 and the network entity 105 may support multiple sets of periodic resources, including at least one set of periodic resources that is assistive of one or more other sets of periodic resources.

In some aspects, the UE 115 and the network entity 105 may configure or use a set of periodic resources, such as a CG-based resource allocation or an SPS-based resource allocation, to reduce a decoding burden on the UE 115 or to reduce latency for URLLC applications, or both. For example, the network entity 105 may configure a set of periodic resources for the UE 115 to use for uplink transmissions and the UE 115 may accordingly transmit uplink data messages via transmission occasions associated with the set of periodic resources. The network entity 105 may attempt to receive and decode the uplink data messages across the transmission occasions associated with the set of periodic resources and, in some cases, may fail to successfully receive and decode one or more of the uplink messages.

In such cases, the network entity 105 may transmit one or more retransmission indications (which may be equivalently referred to as retransmission requests or HARQ feedback) to the UE 115 requesting retransmissions of the one or more missed uplink messages. In some scenarios, however, such a retransmission indication from the network entity 105 may adversely impact energy savings at the network entity 105. For example, in scenarios in which the network entity 105 attempts to reduce network energy consumption, the network entity 105 may enter a sleep state in the downlink direction while maintaining uplink operation (as downlink operation has a relatively large contribution to network energy consumption and uplink operation has a relatively small contribution to network energy consumption).

Such an attempt by the network entity 105 to reduce network energy consumption may correspond to an activation of an NES mode or another power-saving mode (associated with one or more sleep cycles) at the network entity 105. In such scenarios in which the network entity 105 is in an NES mode in which the network entity 105 enters (e.g., activates) a sleep state in the downlink direction while maintaining uplink operation, transmitting a retransmission indication would break the sleep state of the network entity 105, preventing the network entity 105 from saving more energy.

Accordingly, in some implementations, the UE 115 or the network entity 105, or both, may track, calculate, or estimate an average error rate, such as a block error rate (BLER), associated with uplink communications between the UE 115 and the network entity 105 and may leverage the average error rate to proactively configure supporting (e.g., assisting) resources. In other words, if a transmitting node tracks, calculates, or estimates the average error rate, the transmitting node may proactively provide assistive information (such as information that may assist a receiving node to successfully receive and decode one or more messages) without waiting to receive a retransmission indication or HARQ feedback. In other words, the UE 115 or the network entity 105, or both, may assume an average error rate and (proactively) allocate resources for assistive information in accordance with the average error rate.

For example, the UE 115 or the network entity 105 may calculate or estimate a BLER of 10%, which may indicate that, on average, one out of every 10 transmissions fails a decoding process. As such, if the UE 115 transmits 10 transport blocks (TBs) (e.g., data messages) via 10 uplink CG occasions (or any other set of 10 periodic occasions), the UE 115 may assume that the network entity 105 receives one of the 10 TBs in error and may transmit information based on TB1+TB2+ . . . TB10 in an $11^{th}$ occasion of the CG. Such information based on TB1+TB2+ . . . TB10 may be referred to herein as redundant or assistive information. Accordingly, if the network entity 105 successfully receives the information transmitted via the $11^{th}$ occasion, the network entity 105 may be able to decode the 10 TBs regardless of which one of the 10 TBs (if any) was received in error.

In some implementations, the UE 115 and the network entity 105 may support assistive periodic resources (e.g., assistive periodic occasions) via which the UE 115 may transmit assistive information associated with data messages also transmitted by the UE 115. For example, the network entity 105 may transmit control signaling 210 including first information associated with a first set of periodic resources and second information associated with a second set of periodic resources, where the second set of periodic resources may be designated (e.g., indicated, identified, determined, or selected) or otherwise used as assistive of the first set of periodic resources. The second set of periodic resources may be a subset of the first set of periodic resources or may be different from the first set of periodic resources. Further, the contents of the first information and the second information may depend on or be associated with whether the second set of periodic resources is a subset of the first set of periodic resources or is different from the first set of periodic resources.

For example, in implementations in which the second set of periodic resources is a subset of the first set of periodic resources, the first information may include indications of time and frequency resources and a first periodicity associated with the first set of periodic resources and the second information may include indications of a second periodicity and an offset associated with the second set of periodic resources. In such examples, the second periodicity may be a multiple of the first periodicity (e.g., first periodicity=1 slot and second periodicity=5 slots, first periodicity=2 slots and second periodicity=10 slots, etc.) and the offset may be relative to an initial transmission occasion (e.g., a transmission occasion 225-a) associated with the first set of periodic resources.

The UE 115 may use the second periodicity and the offset conveyed via the second information to identify or select the second set of periodic resources from the first set of periodic resources. In other words, within a CG/SPS configuration, the UE 115 may be assigned with an "assistive periodicity" (e.g., the second periodicity) and an assistive occasions offset (e.g., the offset provided via the second information) such that occasions identified or determined by this periodicity and offset may be used for transmissions of redundant information, which may increase the reliability of a set of previous transmissions. Additionally, or alternatively, the UE 115 may receive a DCI message that indicates, to the UE 115, that a following set of transmission occasions are designated as (e.g., identified as, indicated as, determined as, selected as, or may otherwise be used as) assistive occasions. Such a DCI may be of a similar format to a retransmission indication, but without indicating which transmission occasion was received by the network entity 105 in error. Additionally, or alternatively, such a DCI message may indicate that a transmission occasion associated with either or both of the first set of periodic resources and the second set of periodic resources is to be used as an assistive occasion.

In the example of the communication timeline 215 illustrated in FIG. 2, the first set of periodic resources may include a transmission occasion 225-a, a transmission occasion 225-b, a transmission occasion 225-c, a transmission occasion 225-d, a transmission occasion 225-e, a transmission occasion 225-f, a transmission occasion 225-g, a transmission occasion 225-h, a transmission occasion 225-i, and a transmission occasion 225-j. The second set of periodic resources may include the transmission occasion 225-e and the transmission occasion 225-j. As such, the UE 115 may transmit a first set of data messages via each of transmission occasions 225-a through 225-d associated with the first set of periodic resources and may transmit redundant information associated with the first set of data messages via the transmission occasion 225-e associated with the second set of periodic resources. Similarly, the UE 115 may transmit a second set of data messages via each of transmission occasions 225-f through 225-i and may transmit assistive information associated with the second set of data messages via the transmission occasion 225-j associated with the second set of periodic resources.

In implementations in which the second set of periodic resources is different from the first set of periodic resources, the first information may include indications of first time and frequency resources and a first periodicity associated with the first set of periodic resources (e.g., a first CG/SPS configuration) and the second information may include indications of second time and frequency resources and a second periodicity associated with the second set of periodic resources (e.g., a second CG/SPS configuration). In other words, the network entity 105 may configure the UE 115 with one or more (separately or independently configured) assistive CG/SPS configurations such that the UE 115 may use the one or more assistive CG/SPS configurations to increase the reliability and coverage of transmissions of one or more other CG/SPS configurations. Such assistive CP/SGS configurations may be indicated as assistive in an RRC configuration (e.g., via the control signaling 210) or via an activation DCI. Further, an assistive CG/SPS configuration may assist one or multiple other CG/SPS configurations and an assistive CG/SPS configuration may be assistive to another assistive CG/SPS configuration, as illustrated by and described in more detail with reference to FIG. 4.

In the example of the communication timeline 220 illustrated in FIG. 2, the first set of periodic resources may include the transmission occasion 225-a, the transmission occasion 225-b, the transmission occasion 225-c, the transmission occasion 225-d, the transmission occasion 225-e, the transmission occasion 225-f, the transmission occasion 225-g, the transmission occasion 225-h, the transmission occasion 225-i, and the transmission occasion 225-j. The second set of periodic resources may include a transmission occasion 230-a and a transmission occasion 230-b. As such, the UE 115 may transmit a first set of data messages via each of transmission occasions 225-a through 225-e associated with the first set of periodic resources and may transmit redundant information associated with the first set of data messages via the transmission occasion 230-a associated with the second set of periodic resources. Similarly, the UE 115 may transmit a second set of data messages via each of transmission occasions 225-f through 225-j and may transmit assistive information associated with the second set of data messages via the transmission occasion 230-b associated with the second set of periodic resources.

The network entity 105 may configure the UE 115 with how assistive occasions are used (e.g., via the control signaling 210, such as via RRC signaling). Further, as described herein, the assistive information transmitted by the UE 115 may carry or otherwise convey information that is redundant of a set of previously transmitted data messages or otherwise assists the network entity 105 in verifying or correcting any of a set of previously transmitted data messages. In some aspects, the assistive information may include, be an example of, or may otherwise be referred to as redundant information or parity information.

In some implementations, the assistive information may be based on a bitwise operator on the data messages (e.g., the TBs) of a previous x transmission occasions, where x may be stored in a memory of the UE 115 and the network entity 105, configured at the UE 115 via the control signaling 210 (e.g., RRC configured), or dynamically indicated to the UE 115 from the network entity 105 (e.g., via DCI). Such a bitwise operator may include an XOR operation, such that an XOR operator is applied to each of a set of x data messages transmitted via the previous x transmission occasions. The network entity 105 may receive the assistive information and identify an incorrectly received data message (and identify, determine, or calculate the information bits conveyed by that incorrectly received data message), if any, based on comparing the assistive information (e.g., the redundant information) to the data messages received by the network entity 105. As such, introducing assistive CG/SPS configurations or occasions may enable the transmission of redundant bits to increase reliability and uplink coverage with reduced retransmission or HARQ-ACK indications for semi-persistently scheduled resources and CGs.

In some examples, the network entity 105 may set or configure a periodicity associated with an assistive set of periodic resources (e.g., the second set of periodic resources) based on an average error rate (e.g., an average BLER). In other words, the network entity 105 may adapt (e.g., statically, semi-persistently, or dynamically) the configurations associated with an assistive set of periodic resources based on network observation. For example, with a 20% average error rate, the network entity 105 may set or configure the second periodicity of the second set of periodic resources to be 5 times longer than the first periodicity of the first set of periodic resources (e.g., first periodicity=1 slot; second periodicity=5 slots). For further example, with a 10% average error rate, the network entity 105 may set or configure the second periodicity of the second set of periodic resources to be 10 times longer than the first periodicity of the first set of periodic resources (e.g., first periodicity=1 slot; second periodicity=10 slots).

Further, although illustrated by and described with reference to FIG. 2 in the example of uplink communication from the UE 115 to the network entity 105 (such that the transmission occasions may be understood as physical uplink shared channel (PUSCH) occasions), the described use of assistive periodic resources may equally apply for downlink communication from the network entity 105 to the UE 115 or for sidelink communication from the UE 115 to another UE 115.

Figure 3:
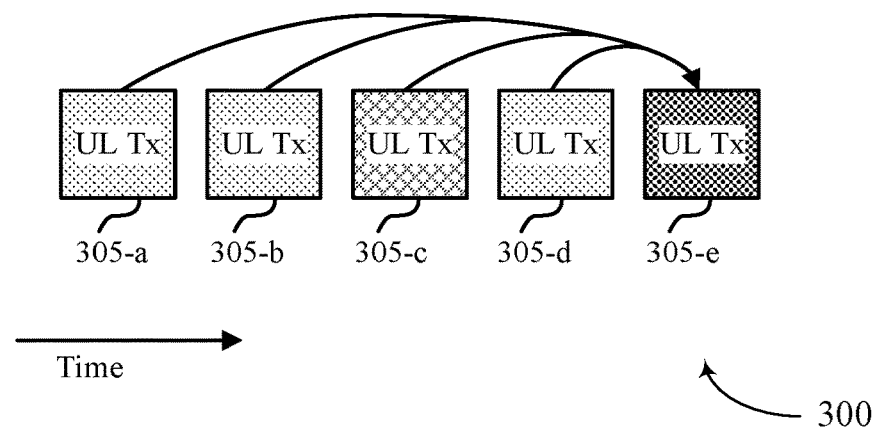
FIGS. 3 and 4 illustrate examples of communication timelines that support assistive periodic resources for reliable and low-latency uplink communication in accordance with one or more aspects of the present disclosure.
Figure 3:
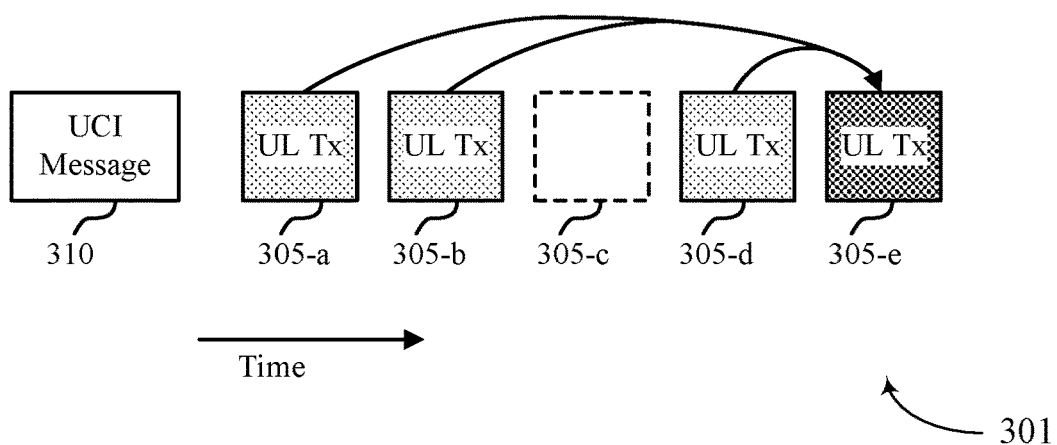

FIG. 3 illustrates examples of communication timelines 300 and 301 that support assistive periodic resources for reliable and low-latency uplink communication in accordance with one or more aspects of the present disclosure. The communication timelines 300 and 301 illustrate examples of how a UE 115 may use an assistive set of periodic resources for redundant transmissions to increase reliability and preempt retransmission indications from the network entity 105. For example, the UE 115 and the network entity 105 may use transmission occasions of a first set of periodic resources for transmitting new or fresh data and may use transmission occasions of a second set of periodic resources for transmitting assistive (e.g., redundant) information associated with the data sent via the transmission occasions of the first set of periodic resources.

In examples in which the UE 115 and the network entity 105 actively use (e.g., in accordance with an RRC- or DCI-based activation) the second set of periodic resources to provide assistive information associated with data transmissions performed via the first set of periodic resources, the UE 115 and the network entity 105 may support one or more configuration- or signaling-based mechanisms according to which the UE 115 and the network entity 105 maintain a same understanding or interpretation of the assistive information in the event that one or more transmission occasions of the first set of periodic resources are skipped. In other words, the UE 115 and the network entity 105 may support assistive periodic occasions (e.g., CG or SPS occasions) and may support one or more mechanisms associated with skipped occasions considerations.

In some implementations, and as illustrated by the communication timeline 300, the UE 115 may transmit an all zeros TB if the UE 115 would otherwise skip the transmission occasion. For example, the first set of periodic resources may include a transmission occasion 305-a, a transmission occasion 305-b, a transmission occasion 305-c, a transmission occasion 305-d, and optionally a transmission occasion 305-e (where the transmission occasion 305-e may also be included in the second set of periodic resources and used for transmitting assistive information) and the UE 115 may transmit a TB of all zero bits via the transmission occasion 305-c if the UE 115 lacks new data that is ready for transmission via the transmission occasion 305-c.

As such, the UE 115 and the network entity 105 may maintain alignment in terms of their respective expectations for how the assistive information transmitted via the transmission occasion 305-e is to be used. For example, by transmitting all zero bits via the transmission occasion 305-c, the UE 115 and the network entity 105 may still generate and use the assistive information transmitted via the transmission occasion 305-e as being based on a bitwise operator of the data messages transmitted via each of the transmission occasions 305-a through 305-d. Further, although described as being a data message or TB of all zero bits, the UE 115 may alternatively transmit a data message or TB of any configured or specified set of bits (e.g., all one bits) if the UE 115 would otherwise skip the transmission occasion 305-c, where the UE 115 and the network entity 105 may support a mutual understanding that the configured or specified set of bits are used when the UE 115 lacks new or fresh data for transmission.

Additionally, or alternatively, and as illustrated by the communication timeline 301, the UE 115 may transmit a UCI message 310 to indicate, to the network entity 105, that the UE 115 may refrain from transmitting via one or more transmission occasions (e.g., the transmission occasion 305-c). In other words, the UE 115 may include an indication in the UCI message 310 that the transmission occasion 305-*c* is skipped based on a lack of new data to be sent via the transmission occasion 305-*c*. As such, the UE 115 may inform the network via UCI that one or more transmission occasions will be skipped, which may enable the network entity 105 to accurately interpret or use the assistive information transmitted via the transmission occasion 305-*e* (as such assistive information may no longer be based on the transmission occasion 305-*c*). Further, although described as being sent prior to the transmission occasions 305-*a* through 305-*d*, the UE 115 may transmit the UCI message 310 at any time during or via any one or more of the transmission occasions 305-*a* through 305-*d*.

Additionally, or alternatively, the UE 115 and the network entity 105 may use any skipped transmission occasions (e.g., the transmission occasion 305-*c*) as an assistive occasion. In some aspects, such transmission occasions that are repurposed as assistive occasions may be referred to or understood as special assistive occasions, as these special assistive occasions may be associated with a dedicated configuration (e.g., a dedicated set of configuration parameters) that may be different from other (e.g., regular) assistive occasions configurations (such as transmission occasions associated with the second set of periodic resources). Such dedicated configuration information associated with transmission occasions that are re-purposed as assistive occasions may be signaled from the network entity 105 to the UE 115.

Figure 4:
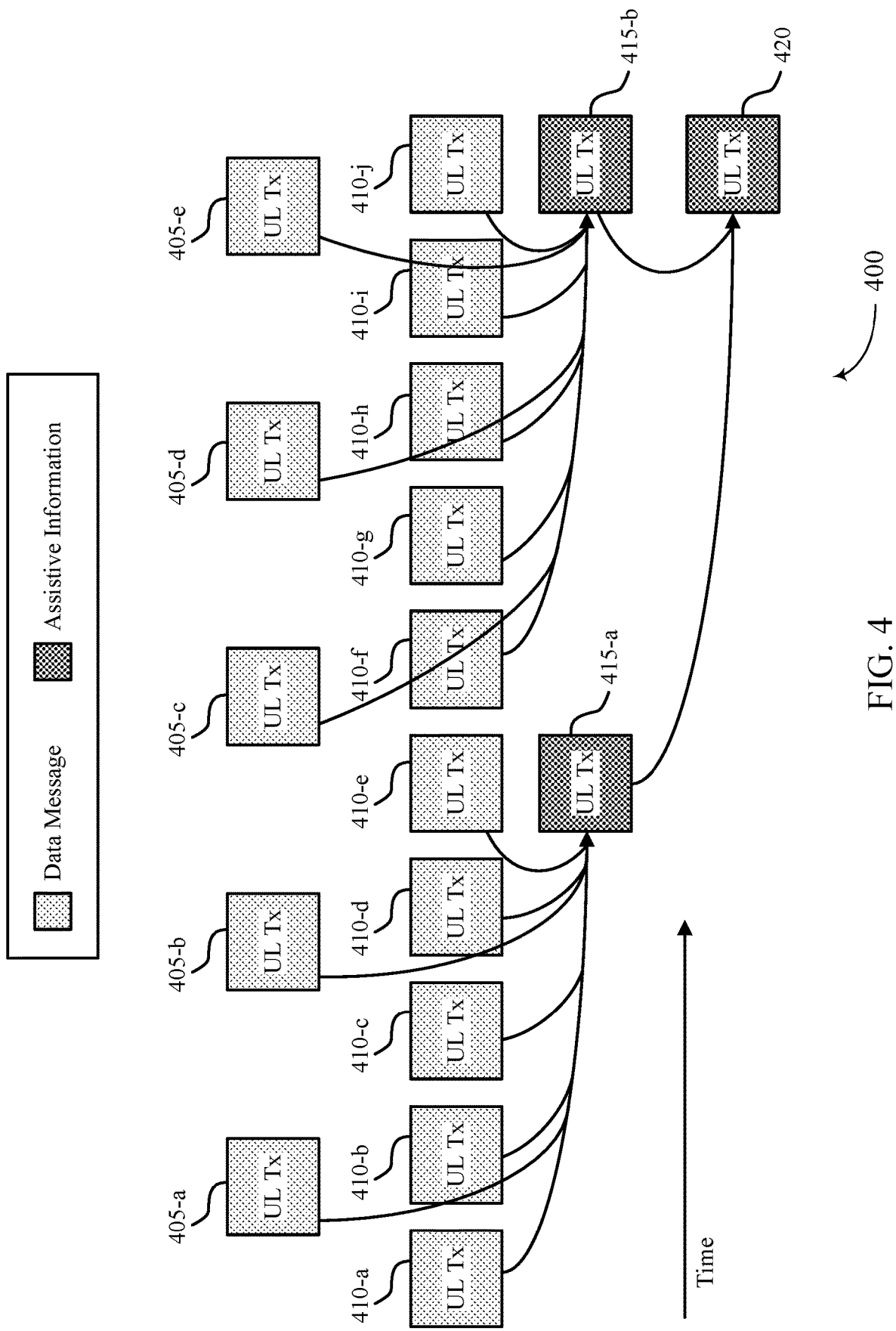

FIG. 4 illustrates an example of a communication timeline 400 that supports assistive periodic resources for reliable and low-latency uplink communication in accordance with one or more aspects of the present disclosure. The communication timeline 400 illustrates an allocation of transmission occasions (e.g., communication resources) associated with multiple sets of periodic resources, where a set of periodic resources may be assistive to multiple other sets of periodic resources and where a set of periodic resources may be assistive to a set of periodic resources that is itself assistive of another set of periodic resources.

For example, the UE 115 and the network entity 105 may support a first set of periodic resources including a transmission occasion 405-*a*, a transmission occasion 405-*b*, a transmission occasion 405-*c*, a transmission occasion 405-*d*, and a transmission occasion 405-*e* and a second set of periodic resources including a transmission occasion 410-*a*, a transmission occasion 410-*b*, a transmission occasion 410-*c*, a transmission occasion 410-*d*, and a transmission occasion 410-*e*, a transmission occasion 410-*f*, a transmission occasion 410-*g*, a transmission occasion 410-*h*, and a transmission occasion 410-*i*, and a transmission occasion 410-*j*. In the example of FIG. 4, the UE 115 and the network entity 105 may use the first set of periodic resources and the second set of periodic resources for transmitting data messages (e.g., including new or fresh data).

Further, the UE 115 and the network entity 105 may support a third set of periodic resources including a transmission occasion 415-*a* and a transmission occasion 415-*b* and a fifth set of periodic resources including a transmission occasion 420. In the example of FIG. 4, the UE 115 and the network entity 105 may use the third set of periodic resources and the fourth set of periodic resources for transmitting assistive (e.g., redundant) information associated with one or more sets of data messages transmitted via the first set of periodic resources or the second set of periodic resources, or both. In some examples, the assistive sets of periodic resources (e.g., the third and fourth sets of periodic resources in the example of FIG. 4) may be either indicated as assistive in an initial configuration (e.g., an RRC configuration) or via an activation DCI.

Further, in some examples, an assistive set of periodic resources (e.g., an assistive CG/SPS configuration) may assist more than one other sets of periodic resources (e.g., more than one UL-CG or set of semi-persistently scheduled resources). For example, the third set of periodic resources (including the transmission occasion 415-*a* and the transmission occasion 415-*b*) may be assistive of both the first set of periodic resources and the second set of periodic resources. In such examples, the assistive information transmitted via, for example, the transmission occasion 415-*a* may be based on a bitwise operator (e.g., an XOR operator) on the data messages transmitted via the transmission occasions 405-*a* and 405-*b* and the transmission occasions 410-*a* through 410-*e*. Similarly, the assistive information transmitted via the transmission occasion 415-*b* may be based on a bitwise operator (e.g., an XOR operator) on the data messages transmitted via the transmission occasions 405-*c* through 405-*e* and the transmission occasions 410-*f* through 410-*j*. In some aspects, the order according to which the XOR operator is applied may be in accordance with an order in which the corresponding data messages are transmitted.

Additionally, or alternatively, the configuration of an assistive set of periodic resources (e.g., an assistive CG/SPS configuration) may be assistive to another assistive set of periodic resources (e.g., another assistive CG/SPS configuration). For example, the fourth set of periodic resources (including the transmission occasion 420) may be assistive of the data messages transmitted via the transmission occasions 415-*a* and 415-*b* of the third set of periodic resources, which include assistive information themselves. In such examples, the assistive (e.g., redundant) information transmitted via the transmission occasion 420 may be based on a bitwise operator (e.g., an XOR operator) on a first data message (including first assistive information) transmitted via the transmission occasion 415-*a* and a second data message (including second assistive information) transmitted via the transmission occasion 415-*b*.

Figure 5:
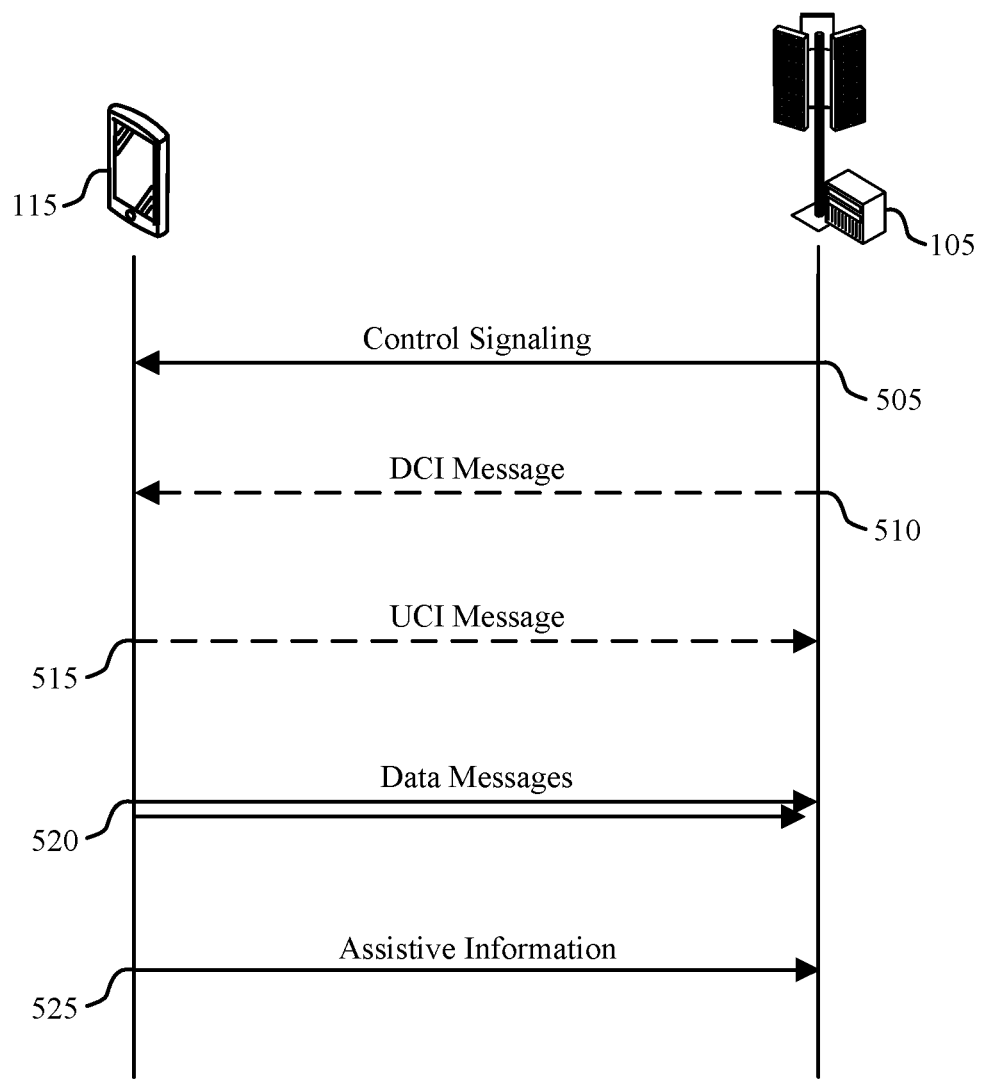
FIG. 5 illustrates an example of a process flow that supports assistive periodic resources for reliable and low-latency uplink communication in accordance with one or more aspects of the present disclosure.

FIG. 5 illustrates an example of a process flow 500 that supports assistive periodic resources for reliable and low-latency uplink communication in accordance with one or more aspects of the present disclosure. The process flow 500 illustrates communication between a UE 115 and a network entity 105. In some implementations, the UE 115 and the network entity 105 may support assistive sets of periodic resources via which the UE 115 may transmit assistive (e.g., redundant) information, such as information that is redundant to or otherwise assistive of previous data transmissions sent via another one or more sets of periodic resources, which may increase the reliability of the previous data transmissions.

In the following description of the process flow 500, the operations may be performed (such as reported or provided) in a different order than the order shown, or the operations performed by the example devices may be performed in different orders or at different times. For example, specific operations also may be left out of the process flow 500, or other operations may be added to the process flow 500. Further, although some operations or signaling may be shown to occur at different times for discussion purposes, these operations may actually occur at the same time.

At 505, the UE 115 may receive, from the network entity, control signaling that includes first information associated with a first set of periodic resources and second information associated with a second set of periodic resources. In some examples, the first set of periodic resources may be associated with a first CG/SPS configuration and the second set of periodic resources may be associated with a second set of CG/SPS configuration. The second set of periodic resources may be assistive of the first set of periodic resources, and the second set of periodic resources may be configured or indicated as assistive resources via the control signaling (e.g., RRC signaling) or via an activating DCI message. In some examples, a periodicity of the second set of periodic resources may be based on an error rate (e.g., a BLER) of uplink communication from the UE.

In some implementations, the first information may include indications of time and frequency resources and a first periodicity associated with the first set of periodic resources and the second information may include indications of a second periodicity and an offset associated with the second set of periodic resources, where the second periodicity may be a multiple of the first periodicity and the offset may be relative to an initial transmission occasion associated with the first set of periodic resources. In such implementations, the second set of periodic resources may be a subset of the first set of periodic resources.

In some other implementations, the first information may include indications of first time and frequency resources and a first periodicity associated with the first set of periodic resources and the second information may include indications of second time and frequency resources and a second periodicity associated with the second set of periodic resources. In such implementations, the second set of periodic resources may be different from the first set of periodic resources.

At 510, the UE 115 may receive, from the network entity 105, a DCI message activating the second set of periodic resources. For example, in scenarios in which the second set of periodic resources is associated with a Type 2 CG PUSCH, the network entity 105 may transmit an activation DCI to indicate one or more parameters associated with the second set of periodic resources and activate the second set of periodic resources. In some implementations, the DCI message (e.g., an activation DCI) may include an indication that the second set of periodic resources is designated as assistive of the first set of periodic resources. In some implementations, the activation of the second set of periodic resources as assistive of the first set of periodic resources may be associated with a switch to an NES mode at the network entity 105. For example, the network entity 105 may switch to a power saving mode and may activate or designate the second set of periodic resources as assistive of the first set of periodic resources accordingly.

At 515, the UE 115 may transmit, to the network entity, a UCI message including an indication that one or more transmission occasions associated with the first set of periodic resources are skipped based on a lack of new data to be sent via the one or more transmission occasions. In some implementations, the UE 115 may include such an indication in a UCI message in accordance with the second set of periodic resources being designated as assistive of the first set of periodic resources. For example, the UE 115 may include such an indication in the UCI message to maintain a mutual understanding or expectation between the UE 115 and the network entity 105 regarding how assistive information is to be generated and interpreted. Additional details relating to such an indication in a UCI message are illustrated by and described with reference to FIG. 3.

At 520, the UE 115 may transmit, to the network entity, a set of data messages via a set of transmission occasions associated with the first set of periodic resources, where a respective data message of the set of data messages is transmitted via a respective transmission occasion of the set of transmission occasions. In some implementations, a data message of the set of data messages may contain or include all zero bits in accordance with a lack of new data be sent via a corresponding transmission occasion. Additional details relating to such a transmission of a data message containing or including all zero bits are illustrated by and described with reference to FIG. 3.

At 525, the UE 115 may transmit, to the network entity, assistive information associated with the set of data messages via a transmission occasion associated with the second set of periodic resources. In some implementations, the transmission occasion associated with the second set of periodic resources may be designated for the assistive information associated with the plurality of data messages (e.g., via RRC signaling, an activation DCI, or a scheduling DCI, among other messages communicated between the UE 115 and the network entity 105). In some implementations, the assistive information, which may include or be understood as at least partially redundant information, associated with the set of data messages may be based on a bitwise operator (e.g., an XOR operator) on the set of data messages. In some examples, the set of data messages may correspond to a previous x transmission occasions, where x may be stored in a memory of the UE 115 and the network entity 105, configured at the UE 115 via the control signaling 210 (e.g., RRC configured), or dynamically indicated to the UE 115 from the network entity 105 (e.g., via DCI).

Further, in some implementations, the UE 115 and the network entity 105 may support one or more additional sets of periodic resources, such as a third set of periodic resources. In some examples, the UE 115 and the network entity 105 may use such a third set of periodic resources for new data transmissions. In such examples, the UE 115 may transmit assistive information for data messages transmitted via transmission occasions of the third set of periodic resources via transmission occasions associated with the second set of periodic resources. In other words, for example, the second set of periodic resources may assist more than one other sets of periodic resources. Additional details relating to how an assistive set of periodic resources can assist multiple other sets of periodic resources are illustrated by and described with reference to FIG. 4.

In some other examples, the UE 115 and the network entity 105 may use such a third set of periodic resources for transmitting additional assistive information. In such examples, the UE 115 may transmit assistive information via transmission occasions associated with the third set of periodic resources, where such assistive information may be based on a bitwise operator on multiple transmissions of assistive information via transmission occasions associated with the second set of periodic resources. In other words, an assistive set of periodic resources may assist another assistive set of periodic resources. Additional details relating to such an additional layer of assistive information transmissions are illustrated by and described with reference to FIG. 4.

Figure 6:
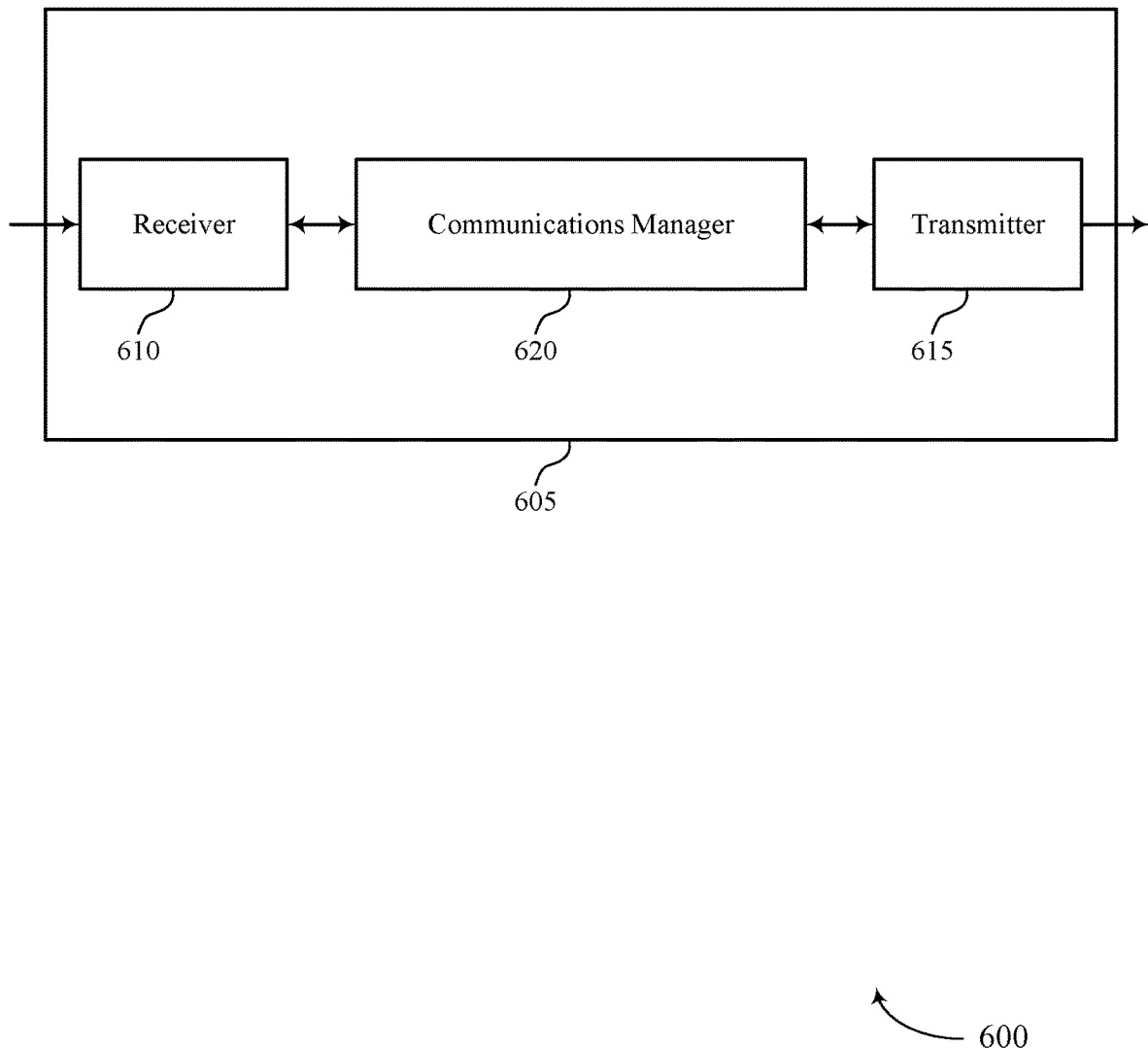
FIGS. 6 and 7 illustrate block diagrams of devices that support assistive periodic resources for reliable and low-latency uplink communication in accordance with one or more aspects of the present disclosure.

FIG. 6 illustrates a block diagram 600 of a device 605 that supports assistive periodic resources for reliable and low-latency uplink communication in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to assistive periodic resources for reliable and low-latency uplink communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to assistive periodic resources for reliable and low-latency uplink communication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of assistive periodic resources for reliable and low-latency uplink communication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving control signaling that includes first information associated with a first set of periodic resources and second information associated with a second set of periodic resources. The communications manager 620 may be configured as or otherwise support a means for transmitting a set of multiple data messages via a set of transmission occasions associated with the first set of periodic resources, where a respective data message of the set of multiple data messages is transmitted via a respective transmission occasion of the set of transmission occasions. The communications manager 620 may be configured as or otherwise support a means for transmitting assistive information associated with the set of multiple data messages via a transmission occasion associated with the second set of periodic resources, where the transmission occasion associated with the second set of periodic resources is designated for the assistive information associated with the set of multiple data messages.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
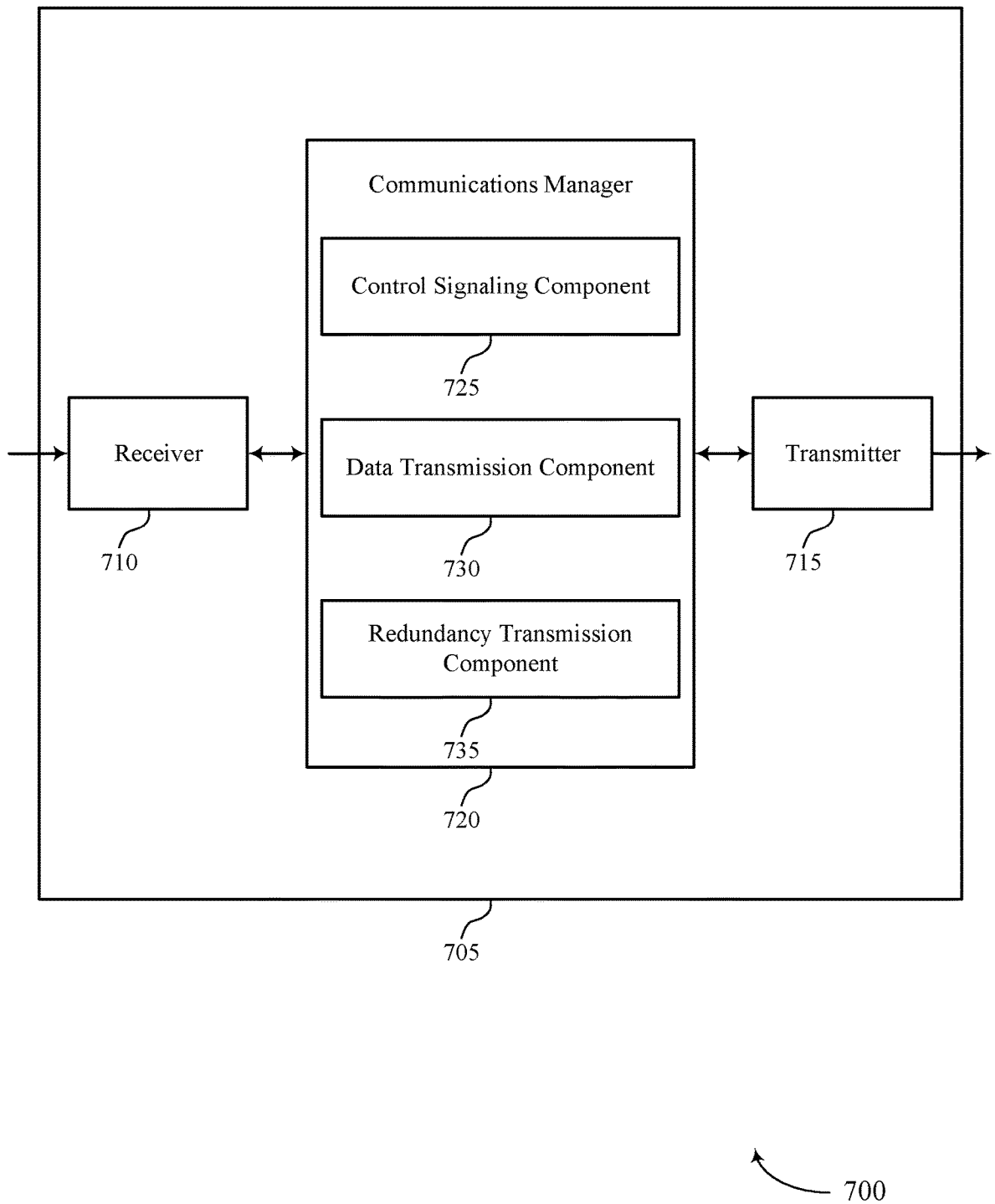

FIG. 7 illustrates a block diagram 700 of a device 705 that supports assistive periodic resources for reliable and low-latency uplink communication in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to assistive periodic resources for reliable and low-latency uplink communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to assistive periodic resources for reliable and low-latency uplink communication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of assistive periodic resources for reliable and low-latency uplink communication as described herein. For example, the communications manager 720 may include a control signaling component 725, a data transmission component 730, a redundancy transmission component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The control signaling component 725 may be configured as or otherwise support a means for receiving control signaling that includes first information associated with a first set of periodic resources and second information associated with a second set of periodic resources. The data transmission component 730 may be configured as or otherwise support a means for transmitting a set of multiple data messages via a set of transmission occasions associated with the first set of periodic resources, where a respective data message of the set of multiple data messages is transmitted via a respective transmission occasion of the set of transmission occasions. The redundancy transmission component 735 may be configured as or otherwise support a means for transmitting assistive information associated with the set of multiple data messages via a transmission occasion associated with the second set of periodic resources, where the transmission occasion associated with the second set of periodic resources is designated for the assistive information associated with the set of multiple data messages.

Figure 8:
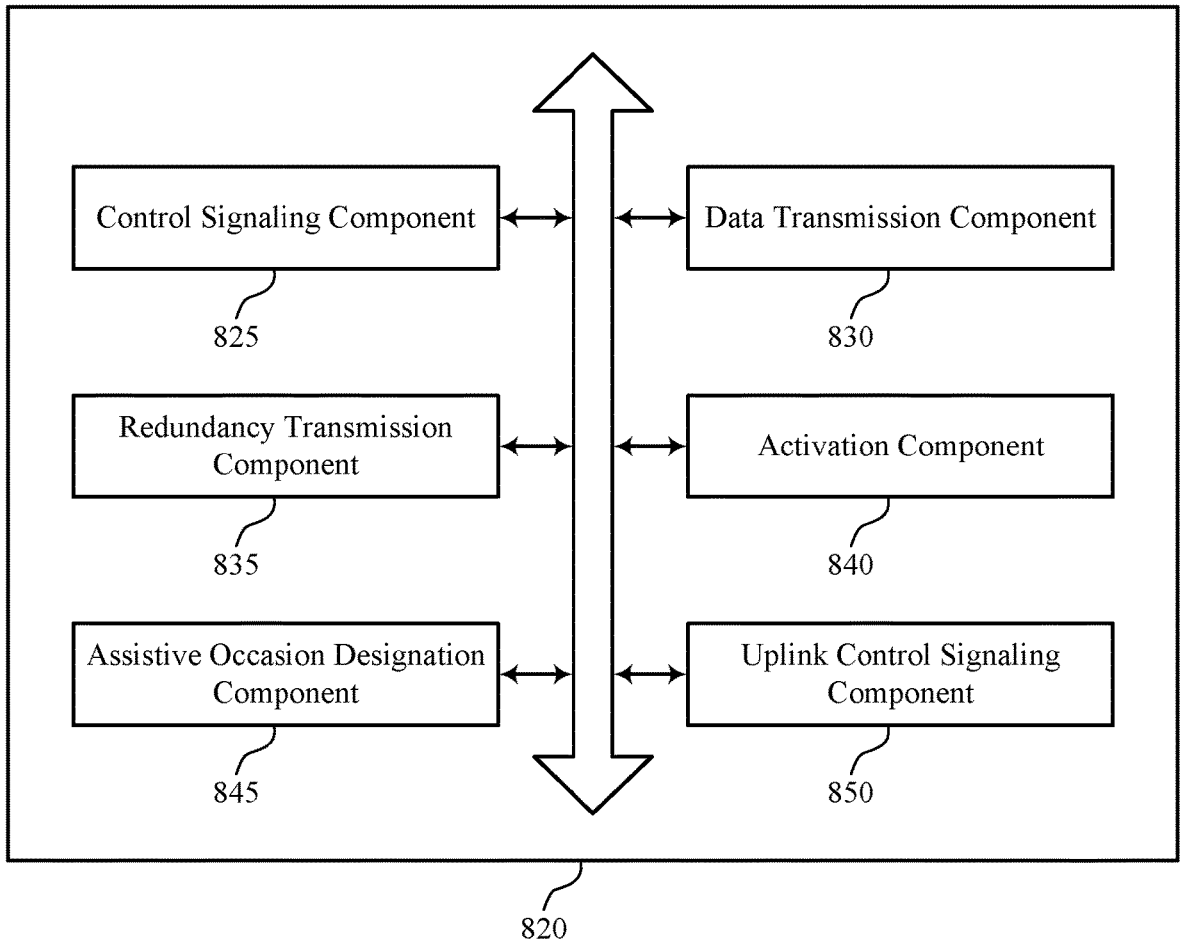
FIG. 8 illustrates a block diagram of a communications manager that supports assistive periodic resources for reliable and low-latency uplink communication in accordance with one or more aspects of the present disclosure.

FIG. 8 illustrates a block diagram 800 of a communications manager 820 that supports assistive periodic resources for reliable and low-latency uplink communication in accordance with one or more aspects of the present disclosure. The communications manager 820 may be an example of aspects of a communications manager 620, a communications manager 720, or both, as described herein. The communications manager 820, or various components thereof, may be an example of means for performing various aspects of assistive periodic resources for reliable and low-latency uplink communication as described herein. For example, the communications manager 820 may include a control signaling component 825, a data transmission component 830, a redundancy transmission component 835, an activation component 840, an assistive occasion designation component 845, an uplink control signaling component 850, or any combination thereof. Each of these components may communicate, directly or indirectly, with one another (e.g., via one or more buses).

The communications manager 820 may support wireless communication at a UE in accordance with examples as disclosed herein. The control signaling component 825 may be configured as or otherwise support a means for receiving control signaling that includes first information associated with a first set of periodic resources and second information associated with a second set of periodic resources. The data transmission component 830 may be configured as or otherwise support a means for transmitting a set of multiple data messages via a set of transmission occasions associated with the first set of periodic resources, where a respective data message of the set of multiple data messages is transmitted via a respective transmission occasion of the set of transmission occasions. The redundancy transmission component 835 may be configured as or otherwise support a means for transmitting assistive information associated with the set of multiple data messages via a transmission occasion associated with the second set of periodic resources, where the transmission occasion associated with the second set of periodic resources is designated for the assistive information associated with the set of multiple data messages.

In some examples, to support receiving the control signaling, the control signaling component 825 may be configured as or otherwise support a means for receiving, via the first information, indications of time and frequency resources and a first periodicity associated with the first set of periodic resources. In some examples, to support receiving the control signaling, the control signaling component 825 may be configured as or otherwise support a means for receiving, via the second information, indications of a second periodicity and an offset associated with the second set of periodic resources, where the second periodicity is a multiple of the first periodicity and the offset is relative to an initial transmission occasion associated with the first set of periodic resources, and where the second set of periodic resources is a subset of the first set of periodic resources.

In some examples, to support receiving the control signaling, the control signaling component 825 may be configured as or otherwise support a means for receiving, via the first information, indications of first time and frequency resources and a first periodicity associated with the first set of periodic resources. In some examples, to support receiving the control signaling, the control signaling component 825 may be configured as or otherwise support a means for receiving, via the second information, indications of second time and frequency resources and a second periodicity associated with the second set of periodic resources, where the second set of periodic resources are different from the first set of periodic resources.

In some examples, to support receiving the control signaling, the control signaling component 825 may be configured as or otherwise support a means for receiving, via the second information, an indication that the second set of periodic resources is designated as assistive of the first set of periodic resources, where transmitting the assistive information is based on the indication.

In some examples, the activation component 840 may be configured as or otherwise support a means for receiving a downlink control information message activating the second set of periodic resources, where the downlink control information message includes an indication that the second set of periodic resources is designated as assistive of the first set of periodic resources, where transmitting the assistive information is based on the indication.

In some examples, the data transmission component 830 may be configured as or otherwise support a means for transmitting a second set of multiple data messages via a second set of transmission occasions associated with the first set of periodic resources. In some examples, the assistive occasion designation component 845 may be configured as or otherwise support a means for receiving a downlink control information message including an indication that a second transmission occasion associated with the first set of periodic resources is designated for second assistive information associated with the second set of multiple data messages. In some examples, the redundancy transmission component 835 may be configured as or otherwise support a means for transmitting the second assistive information via the second transmission occasion based on the second transmission occasion being designated for the second assistive information.

In some examples, to support transmitting the set of multiple data messages via the set of transmission occasions associated with the first set of periodic resources, the data transmission component 830 may be configured as or otherwise support a means for transmitting a first data message containing all zero bits via a first transmission occasion of the set of transmission occasions based on a lack of new data to be sent via the first transmission occasion and in accordance with the transmission occasion associated with the second set of periodic resources being designated for the assistive information associated with the set of multiple data messages, where the assistive information is based on the first data message containing all zero bits.

In some examples, the uplink control signaling component 850 may be configured as or otherwise support a means for transmitting an uplink control information message including an indication that a first transmission occasion associated with the first set of periodic resources is skipped based on a lack of new data to be sent via the first transmission occasion and in accordance with the transmission occasion associated with the second set of periodic resources being designated for the assistive information.

In some examples, the redundancy transmission component 835 may be configured as or otherwise support a means for transmitting second assistive information associated with a second set of multiple data messages via a first transmission occasion associated with the first set of periodic resources, where the first transmission occasion is used for the second assistive information based on a lack of new data to be sent via the first transmission occasion.

In some examples, the control signaling component 825 may be configured as or otherwise support a means for receiving third information associated with a third set of periodic resources. In some examples, the data transmission component 830 may be configured as or otherwise support a means for transmitting a second set of multiple data messages via a second set of transmission occasions associated with the third set of periodic resources. In some examples, the redundancy transmission component 835 may be configured as or otherwise support a means for transmitting second assistive information associated with the second set of multiple data messages via the transmission occasion associated with the second set of periodic resources, where the transmission occasion is designated for the assistive information associated with the set of multiple data messages and the second assistive information associated with the second set of multiple data messages.

In some examples, the control signaling component 825 may be configured as or otherwise support a means for receiving third information associated with a third set of periodic resources. In some examples, the data transmission component 830 may be configured as or otherwise support a means for transmitting a second set of multiple data messages via a second set of transmission occasions associated with the first set of periodic resources. In some examples, the redundancy transmission component 835 may be configured as or otherwise support a means for transmitting second assistive information associated with the second set of multiple data messages via a second transmission occasion associated with the second set of periodic resources. In some examples, the redundancy transmission component 835 may be configured as or otherwise support a means for transmitting third assistive information associated with the assistive information and the second assistive information via a third transmission occasion associated with the third set of periodic resources, where the third transmission occasion is designated for the third assistive information associated with the assistive information and the second assistive information.

In some examples, the assistive information associated with the set of multiple data messages is based on a bitwise operator on the set of multiple data messages. In some examples, the assistive information includes redundant information associated with the set of multiple data messages in accordance with the bitwise operator on the set of multiple data messages. In some examples, an indication of a quantity of the set of multiple data messages is included in the control signaling.

In some examples, a periodicity associated with the second set of periodic resources is based on a block error rate of uplink communication from the UE.

In some examples, an activation of the second set of periodic resources as assistive of the first set of periodic resources is associated with a switch to a network energy saving mode. In some examples, transmitting the assistive information associated with the set of multiple data messages via the transmission occasion associated with the second set of periodic resources is based on the activation of the second set of periodic resources as assistive of the first set of periodic resources.

Figure 9:
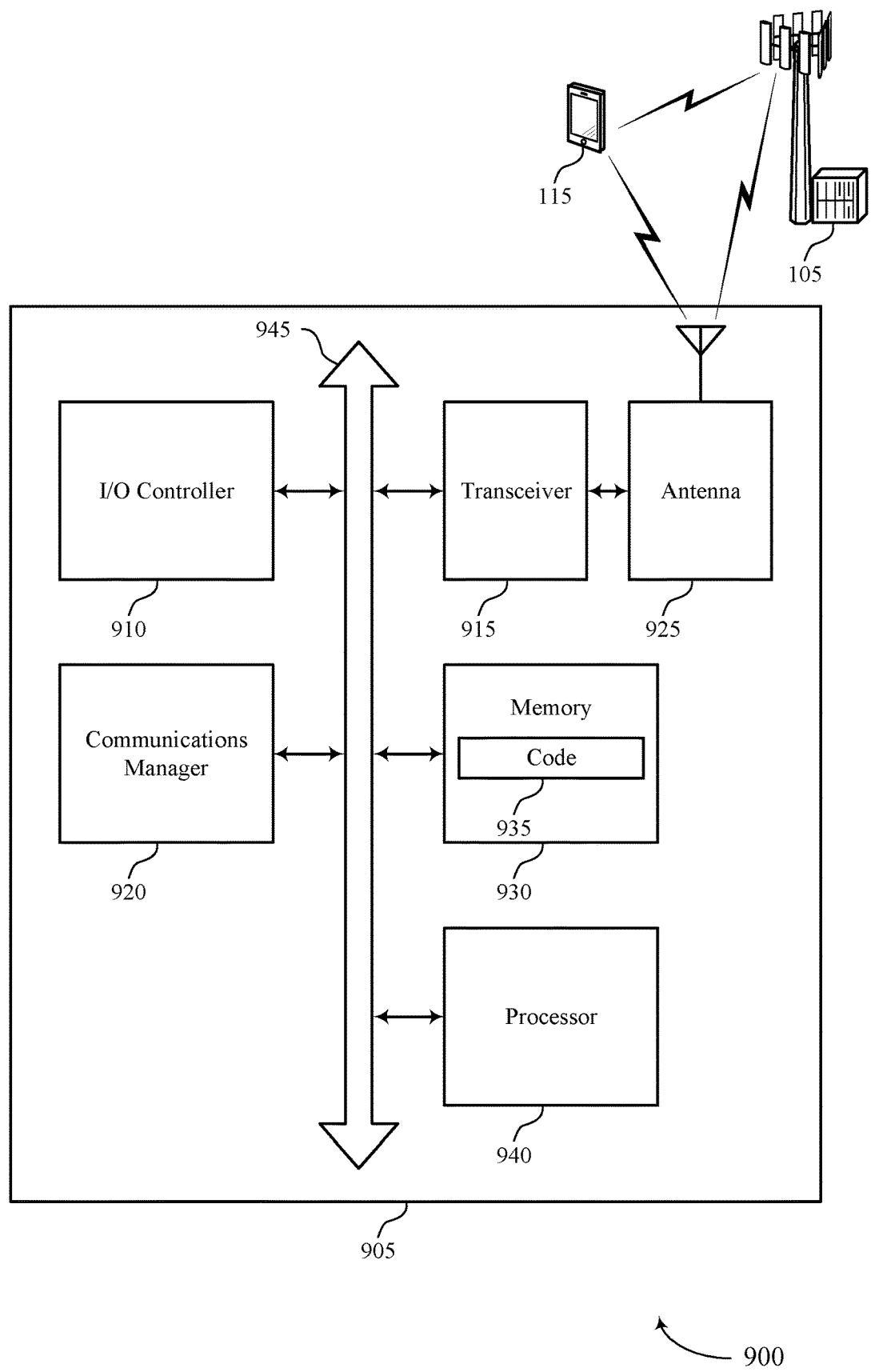
FIG. 9 illustrates a diagram of a system including a device that supports assistive periodic resources for reliable and low-latency uplink communication in accordance with one or more aspects of the present disclosure.

FIG. 9 illustrates a diagram of a system 900 including a device 905 that supports assistive periodic resources for reliable and low-latency uplink communication in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting assistive periodic resources for reliable and low-latency uplink communication). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving control signaling that includes first information associated with a first set of periodic resources and second information associated with a second set of periodic resources. The communications manager 920 may be configured as or otherwise support a means for transmitting a set of multiple data messages via a set of transmission occasions associated with the first set of periodic resources, where a respective data message of the set of multiple data messages is transmitted via a respective transmission occasion of the set of transmission occasions. The communications manager 920 may be configured as or otherwise support a means for transmitting assistive information associated with the set of multiple data messages via a transmission occasion associated with the second set of periodic resources, where the transmission occasion associated with the second set of periodic resources is designated for the assistive information associated with the set of multiple data messages.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of assistive periodic resources for reliable and low-latency uplink communication as described herein, or the processor 940 and the memory 930 may be otherwise configured to perform or support such operations.

Figure 10:
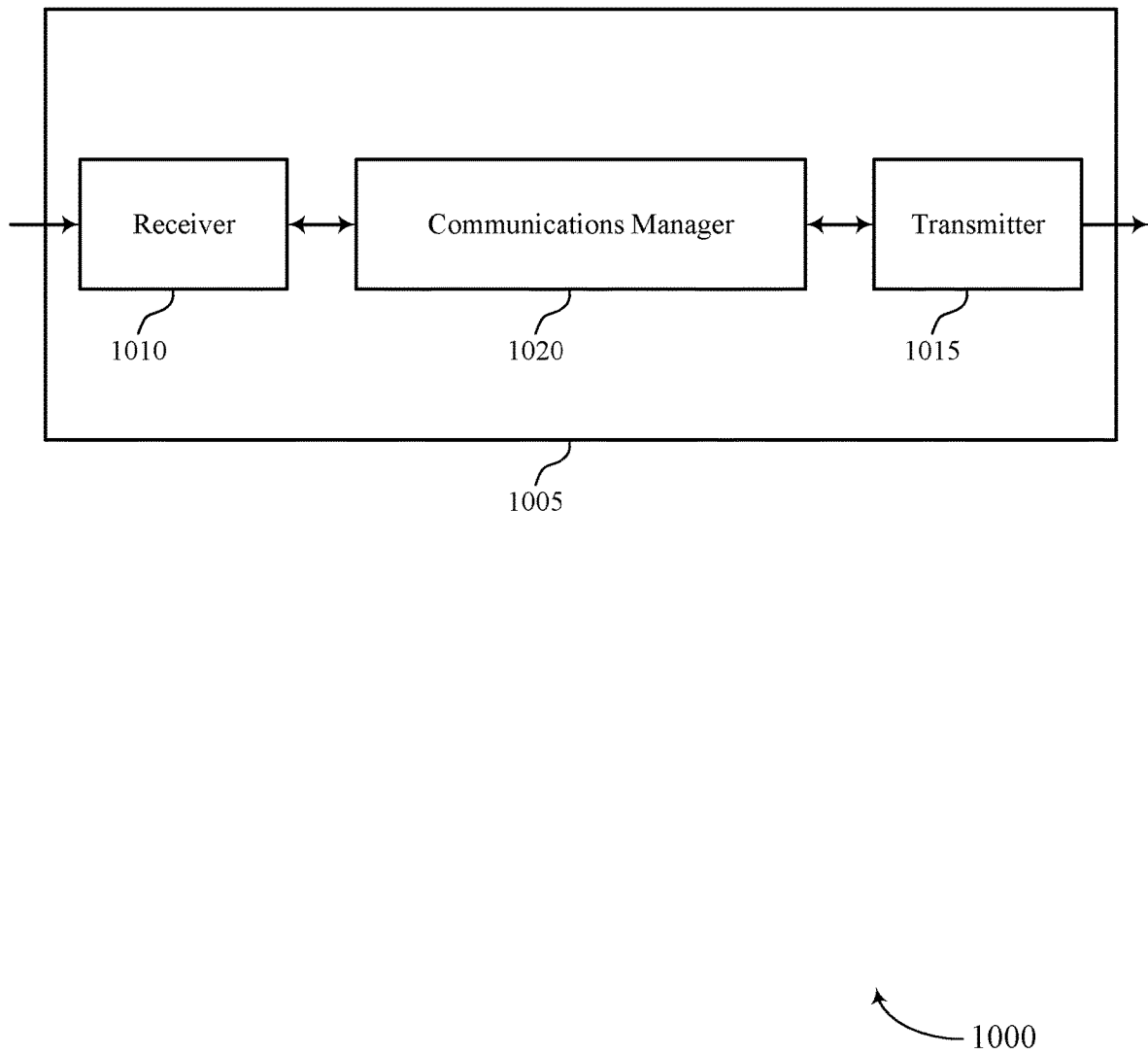
FIGS. 10 and 11 illustrate block diagrams of devices that support assistive periodic resources for reliable and low-latency uplink communication in accordance with one or more aspects of the present disclosure.

FIG. 10 illustrates a block diagram 1000 of a device 1005 that supports assistive periodic resources for reliable and low-latency uplink communication in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of assistive periodic resources for reliable and low-latency uplink communication as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting control signaling that includes first information associated with a first set of periodic resources and second information associated with a second set of periodic resources. The communications manager 1020 may be configured as or otherwise support a means for receiving a set of multiple data messages via a set of transmission occasions associated with the first set of periodic resources, where a respective data message of the set of multiple data messages is received via a respective transmission occasion of the set of transmission occasions. The communications manager 1020 may be configured as or otherwise support a means for receiving assistive information associated with the set of multiple data messages via a transmission occasion associated with the second set of periodic resources, where the transmission occasion associated with the second set of periodic resources is designated for the assistive information associated with the set of multiple data messages.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
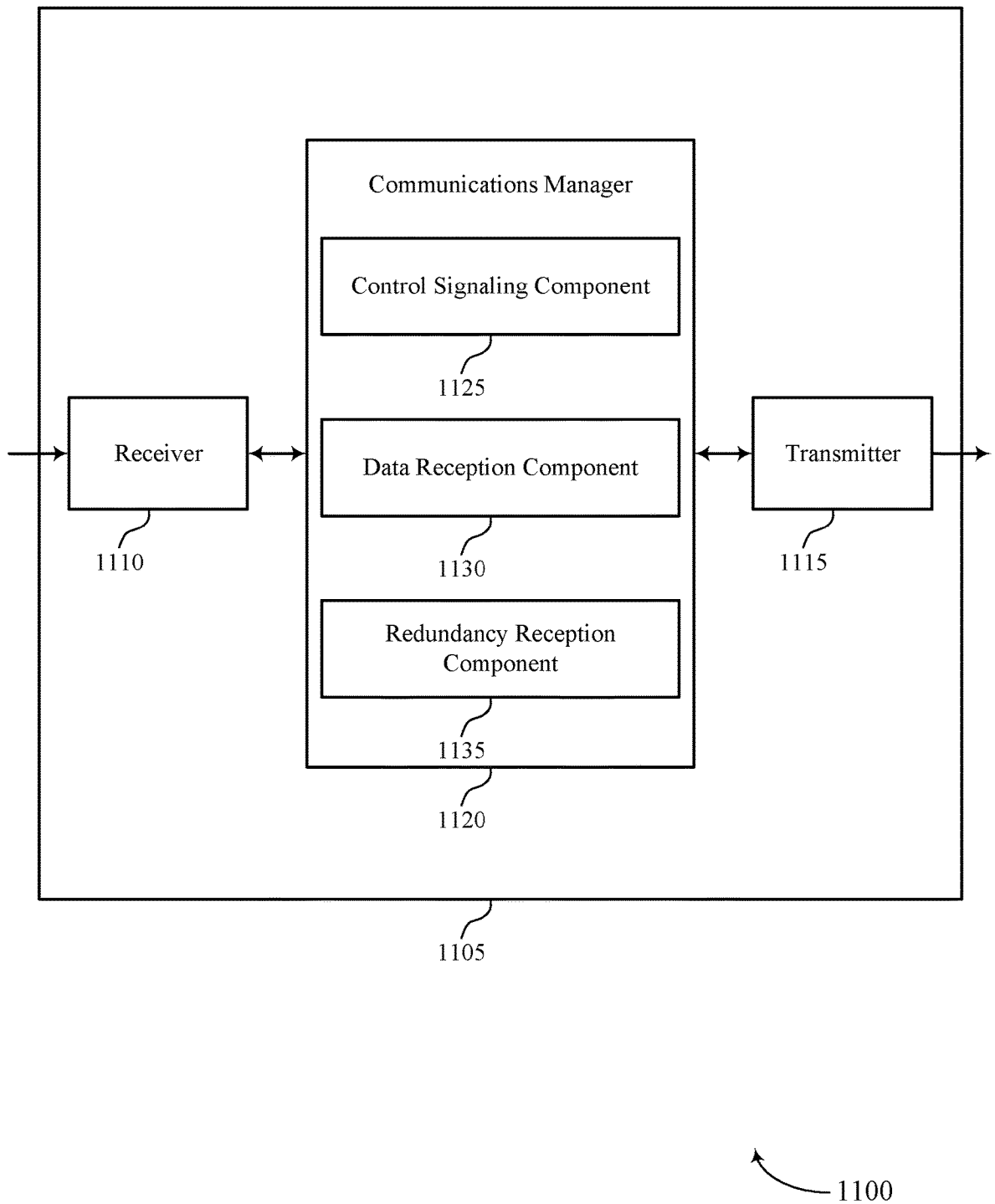

FIG. 11 illustrates a block diagram 1100 of a device 1105 that supports assistive periodic resources for reliable and low-latency uplink communication in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of assistive periodic resources for reliable and low-latency uplink communication as described herein. For example, the communications manager 1120 may include a control signaling component 1125, a data reception component 1130, a redundancy reception component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The control signaling component 1125 may be configured as or otherwise support a means for transmitting control signaling that includes first information associated with a first set of periodic resources and second information associated with a second set of periodic resources. The data reception component 1130 may be configured as or otherwise support a means for receiving a set of multiple data messages via a set of transmission occasions associated with the first set of periodic resources, where a respective data message of the set of multiple data messages is received via a respective transmission occasion of the set of transmission occasions. The redundancy reception component 1135 may be configured as or otherwise support a means for receiving assistive information associated with the set of multiple data messages via a transmission occasion associated with the second set of periodic resources, where the transmission occasion associated with the second set of periodic resources is designated for the assistive information associated with the set of multiple data messages.

Figure 12:
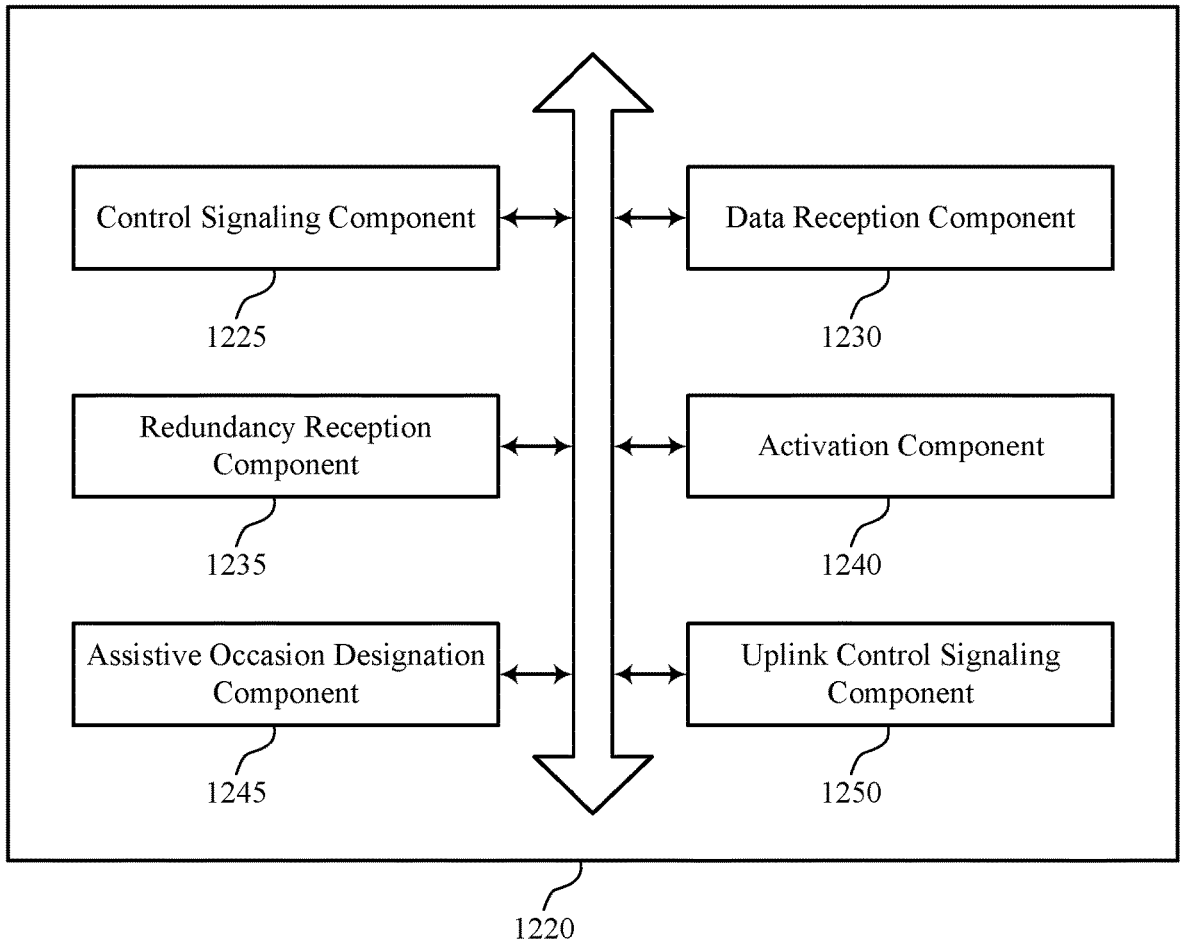
FIG. 12 illustrates a block diagram of a communications manager that supports assistive periodic resources for reliable and low-latency uplink communication in accordance with one or more aspects of the present disclosure.

FIG. 12 illustrates a block diagram 1200 of a communications manager 1220 that supports assistive periodic resources for reliable and low-latency uplink communication in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of assistive periodic resources for reliable and low-latency uplink communication as described herein. For example, the communications manager 1220 may include a control signaling component 1225, a data reception component 1230, a redundancy reception component 1235, an activation component 1240, an assistive occasion designation component 1245, an uplink control signaling component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The control signaling component 1225 may be configured as or otherwise support a means for transmitting control signaling that includes first information associated with a first set of periodic resources and second information associated with a second set of periodic resources. The data reception component 1230 may be configured as or otherwise support a means for receiving a set of multiple data messages via a set of transmission occasions associated with the first set of periodic resources, where a respective data message of the set of multiple data messages is received via a respective transmission occasion of the set of transmission occasions. The redundancy reception component 1235 may be configured as or otherwise support a means for receiving assistive information associated with the set of multiple data messages via a transmission occasion associated with the second set of periodic resources, where the transmission occasion associated with the second set of periodic resources is designated for the assistive information associated with the set of multiple data messages.

In some examples, to support transmitting the control signaling, the control signaling component 1225 may be configured as or otherwise support a means for transmitting, via the first information, indications of time and frequency resources and a first periodicity associated with the first set of periodic resources. In some examples, to support transmitting the control signaling, the control signaling component 1225 may be configured as or otherwise support a means for transmitting, via the second information, indications of a second periodicity and an offset associated with the second set of periodic resources, where the second periodicity is a multiple of the first periodicity and the offset is relative to an initial transmission occasion associated with the first set of periodic resources, and where the second set of periodic resources is a subset of the first set of periodic resources.

In some examples, to support transmitting the control signaling, the control signaling component 1225 may be configured as or otherwise support a means for transmitting, via the first information, indications of first time and frequency resources and a first periodicity associated with the first set of periodic resources. In some examples, to support transmitting the control signaling, the control signaling component 1225 may be configured as or otherwise support a means for transmitting, via the second information, indications of second time and frequency resources and a second periodicity associated with the second set of periodic resources, where the second set of periodic resources are different from the first set of periodic resources.

In some examples, to support transmitting the control signaling, the control signaling component 1225 may be configured as or otherwise support a means for transmitting, via the second information, an indication that the second set of periodic resources is designated as assistive of the first set of periodic resources, where receiving the assistive information is based on the indication.

In some examples, the activation component 1240 may be configured as or otherwise support a means for transmitting a downlink control information message activating the second set of periodic resources, where the downlink control information message includes an indication that the second set of periodic resources is designated as assistive of the first set of periodic resources, where receiving the assistive information is based on the indication.

In some examples, the data reception component 1230 may be configured as or otherwise support a means for receiving a second set of multiple data messages via a second set of transmission occasions associated with the first set of periodic resources. In some examples, the assistive occasion designation component 1245 may be configured as or otherwise support a means for transmitting a downlink control information message including an indication that a second transmission occasion associated with the first set of periodic resources is designated for second assistive information associated with the second set of multiple data messages. In some examples, the redundancy reception component 1235 may be configured as or otherwise support a means for receiving the second assistive information via the second transmission occasion based on the second transmission occasion being designated for the second assistive information.

In some examples, to support receiving the set of multiple data messages via the set of transmission occasions associated with the first set of periodic resources, the data reception component 1230 may be configured as or otherwise support a means for receiving a first data message containing all zero bits via a first transmission occasion of the set of transmission occasions based on a lack of new data to be sent via the first transmission occasion and in accordance with the transmission occasion associated with the second set of periodic resources being designated for the assistive information associated with the set of multiple data messages, where the assistive information is based on the first data message containing all zero bits.

In some examples, the uplink control signaling component 1250 may be configured as or otherwise support a means for receiving an uplink control information message including an indication that a first transmission occasion associated with the first set of periodic resources is skipped based on a lack of new data to be sent via the first transmission occasion and in accordance with the transmission occasion associated with the second set of periodic resources being designated for the assistive information.

In some examples, the redundancy reception component 1235 may be configured as or otherwise support a means for receiving second assistive information associated with a second set of multiple data messages via a first transmission occasion associated with the first set of periodic resources, where the first transmission occasion is used for the second assistive information based on a lack of new data to be sent via the first transmission occasion.

In some examples, the control signaling component 1225 may be configured as or otherwise support a means for transmitting third information associated with a third set of periodic resources. In some examples, the data reception component 1230 may be configured as or otherwise support a means for receiving a second set of multiple data messages via a second set of transmission occasions associated with the third set of periodic resources. In some examples, the redundancy reception component 1235 may be configured as or otherwise support a means for receiving second assistive information associated with the second set of multiple data messages via the transmission occasion associated with the second set of periodic resources, where the transmission occasion is designated for the assistive information associated with the set of multiple data messages and the second assistive information associated with the second set of multiple data messages.

In some examples, the control signaling component 1225 may be configured as or otherwise support a means for transmitting third information associated with a third set of periodic resources. In some examples, the data reception component 1230 may be configured as or otherwise support a means for receiving a second set of multiple data messages via a second set of transmission occasions associated with the first set of periodic resources. In some examples, the redundancy reception component 1235 may be configured as or otherwise support a means for receiving second assistive information associated with the second set of multiple data messages via a second transmission occasion associated with the second set of periodic resources. In some examples, the redundancy reception component 1235 may be configured as or otherwise support a means for receiving third assistive information associated with the assistive information and the second assistive information via a third transmission occasion associated with the third set of periodic resources, where the third transmission occasion is designated for the third assistive information associated with the assistive information and the second assistive information.

In some examples, the assistive information associated with the set of multiple data messages is based on a bitwise operator on the set of multiple data messages. In some examples, the assistive information includes redundant information associated with the set of multiple data messages in accordance with the bitwise operator on the set of multiple data messages. In some examples, an indication of a quantity of the set of multiple data messages is included in the control signaling.

In some examples, a periodicity associated with the second set of periodic resources is based on a block error rate of uplink communication from a UE.

In some examples, an activation of the second set of periodic resources as assistive of the first set of periodic resources is associated with a switch to a network energy saving mode. In some examples, receiving the assistive information associated with the set of multiple data messages via the transmission occasion associated with the second set of periodic resources is based on the activation of the second set of periodic resources as assistive of the first set of periodic resources.

Figure 13:
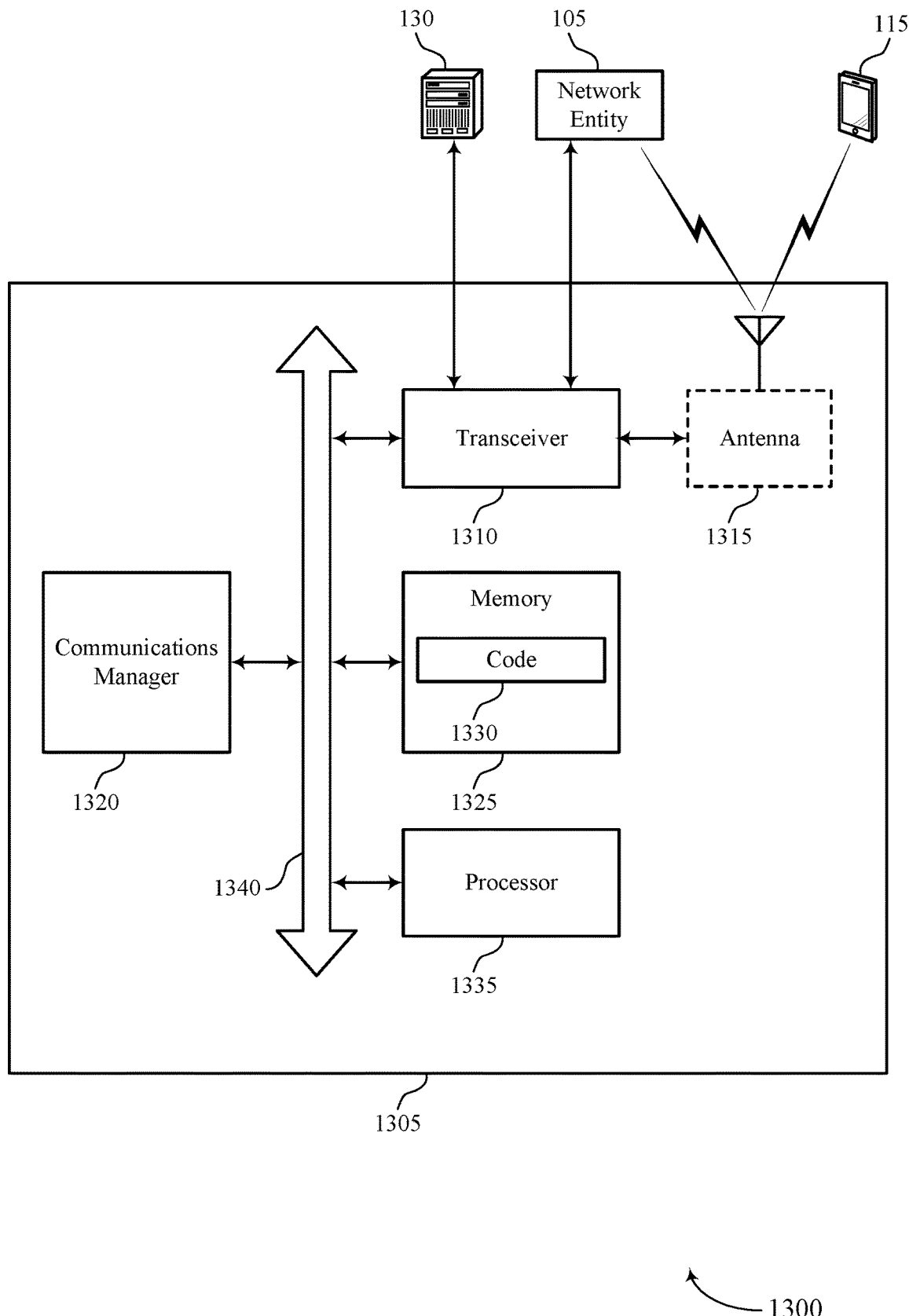
FIG. 13 illustrates a diagram of a system including a device that supports assistive periodic resources for reliable and low-latency uplink communication in accordance with one or more aspects of the present disclosure.

FIG. 13 illustrates a diagram of a system 1300 including a device 1305 that supports assistive periodic resources for reliable and low-latency uplink communication in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting assistive periodic resources for reliable and low-latency uplink communication). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325).

In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations.

In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with ULEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting control signaling that includes first information associated with a first set of periodic resources and second information associated with a second set of periodic resources. The communications manager 1320 may be configured as or otherwise support a means for receiving a set of multiple data messages via a set of transmission occasions associated with the first set of periodic resources, where a respective data message of the set of multiple data messages is received via a respective transmission occasion of the set of transmission occasions. The communications manager 1320 may be configured as or otherwise support a means for receiving assistive information associated with the set of multiple data messages via a transmission occasion associated with the second set of periodic resources, where the transmission occasion associated with the second set of periodic resources is designated for the assistive information associated with the set of multiple data messages.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of assistive periodic resources for reliable and low-latency uplink communication as described herein, or the processor 1335 and the memory 1325 may be otherwise configured to perform or support such operations.

Figure 14:
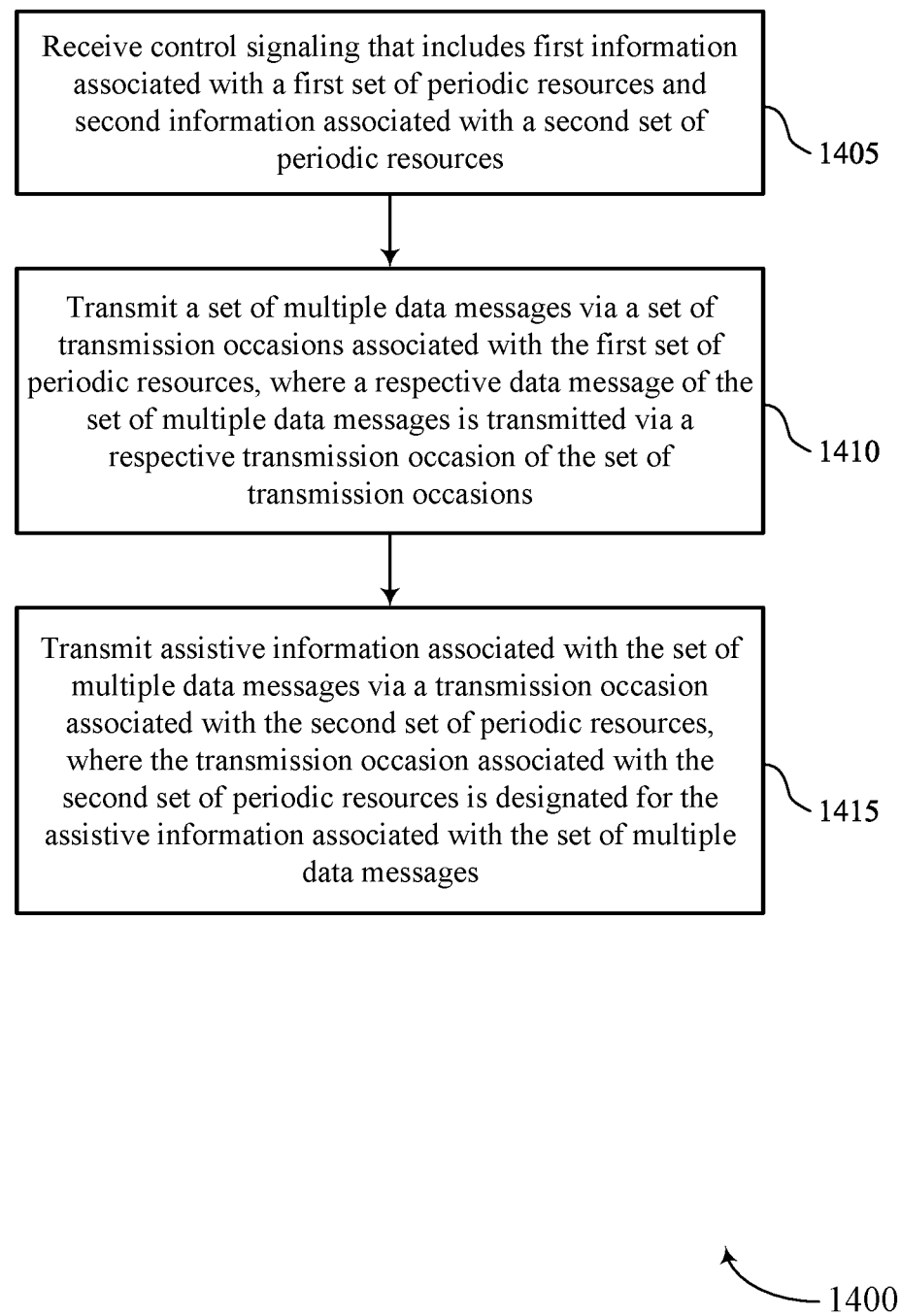
FIGS. 14 and 15 illustrate flowcharts showing methods that support assistive periodic resources for reliable and low-latency uplink communication in accordance with one or more aspects of the present disclosure.

FIG. 14 illustrates a flowchart showing a method 1400 that supports assistive periodic resources for reliable and low-latency uplink communication in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving control signaling that includes first information associated with a first set of periodic resources and second information associated with a second set of periodic resources. The operations of 1405 may be performed in accordance with examples as disclosed herein. In some examples, aspects of the operations of 1405 may be performed by a control signaling component 825 as described with reference to FIG. 8.

At 1410, the method may include transmitting a set of multiple data messages via a set of transmission occasions associated with the first set of periodic resources, where a respective data message of the set of multiple data messages is transmitted via a respective transmission occasion of the set of transmission occasions. The operations of 1410 may be performed in accordance with examples as disclosed herein. In some examples, aspects of the operations of 1410 may be performed by a data transmission component 830 as described with reference to FIG. 8.

At 1415, the method may include transmitting assistive information associated with the set of multiple data messages via a transmission occasion associated with the second set of periodic resources, where the transmission occasion associated with the second set of periodic resources is designated for the assistive information associated with the set of multiple data messages. The operations of 1415 may be performed in accordance with examples as disclosed herein. In some examples, aspects of the operations of 1415 may be performed by a redundancy transmission component 835 as described with reference to FIG. 8.

Figure 15:
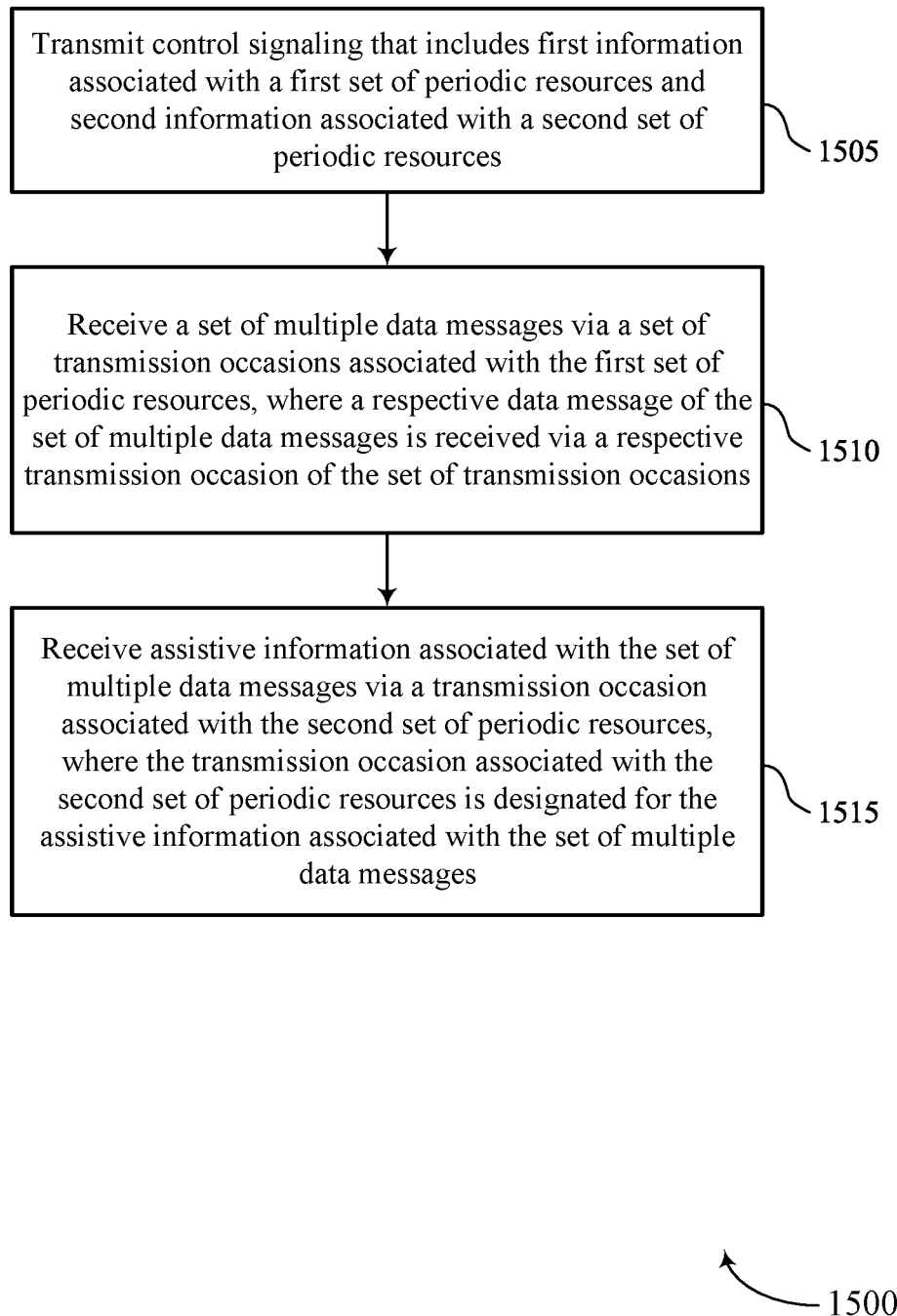

FIG. 15 illustrates a flowchart showing a method 1500 that supports assistive periodic resources for reliable and low-latency uplink communication in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting control signaling that includes first information associated with a first set of periodic resources and second information associated with a second set of periodic resources. The operations of 1505 may be performed in accordance with examples as disclosed herein. In some examples, aspects of the operations of 1505 may be performed by a control signaling component 1225 as described with reference to FIG. 12.

At 1510, the method may include receiving a set of multiple data messages via a set of transmission occasions associated with the first set of periodic resources, where a respective data message of the set of multiple data messages is received via a respective transmission occasion of the set of transmission occasions. The operations of 1510 may be performed in accordance with examples as disclosed herein. In some examples, aspects of the operations of 1510 may be performed by a data reception component 1230 as described with reference to FIG. 12.

At 1515, the method may include receiving assistive information associated with the set of multiple data messages via a transmission occasion associated with the second set of periodic resources, where the transmission occasion associated with the second set of periodic resources is designated for the assistive information associated with the set of multiple data messages. The operations of 1515 may be performed in accordance with examples as disclosed herein. In some examples, aspects of the operations of 1515 may be performed by a redundancy reception component 1235 as described with reference to FIG. 12.

The following provides an overview of aspects of the present disclosure:

Aspect 1: A method for wireless communication at a UE, comprising: receiving control signaling that includes first information associated with a first set of periodic resources and second information associated with a second set of periodic resources; transmitting a plurality of data messages via a set of transmission occasions associated with the first set of periodic resources, wherein a respective data message of the plurality of data messages is transmitted via a respective transmission occasion of the set of transmission occasions; and transmitting assistive information associated with the plurality of data messages via a transmission occasion associated with the second set of periodic resources, wherein the transmission occasion associated with the second set of periodic resources is designated for the assistive information associated with the plurality of data messages.

Aspect 2: The method of aspect 1, wherein receiving the control signaling further comprises: receiving, via the first information, indications of time and frequency resources and a first periodicity associated with the first set of periodic resources; and receiving, via the second information, indications of a second periodicity and an offset associated with the second set of periodic resources, wherein the second periodicity is a multiple of the first periodicity and the offset is relative to an initial transmission occasion associated with the first set of periodic resources, and wherein the second set of periodic resources is a subset of the first set of periodic resources.

Aspect 3: The method of aspect 1, wherein receiving the control signaling further comprises: receiving, via the first information, indications of first time and frequency resources and a first periodicity associated with the first set of periodic resources; and receiving, via the second information, indications of second time and frequency resources and a second periodicity associated with the second set of periodic resources, wherein the second set of periodic resources are different from the first set of periodic resources.

Aspect 4: The method of any of aspects 1 through 3, wherein receiving the control signaling further comprises: receiving, via the second information, an indication that the second set of periodic resources is designated as assistive of the first set of periodic resources, wherein transmitting the assistive information is based at least in part on the indication.

Aspect 5: The method of any of aspects 1 through 4, further comprising: receiving a DCI message activating the second set of periodic resources, wherein the DCI message includes an indication that the second set of periodic resources is designated as assistive of the first set of periodic resources, wherein transmitting the assistive information is based at least in part on the indication.

Aspect 6: The method of any of aspects 1 through 5, further comprising: transmitting a second plurality of data messages via a second set of transmission occasions associated with the first set of periodic resources; receiving a DCI message including an indication that a second transmission occasion associated with the first set of periodic resources is designated for second assistive information associated with the second plurality of data messages; and transmitting the second assistive information via the second transmission occasion based at least in part on the second transmission occasion being designated for the second assistive information.

Aspect 7: The method of any of aspects 1 through 6, wherein transmitting the plurality of data messages via the set of transmission occasions associated with the first set of periodic resources further comprises: transmitting a first data message containing all zero bits via a first transmission occasion of the set of transmission occasions based at least in part on a lack of new data to be sent via the first transmission occasion and in accordance with the transmission occasion associated with the second set of periodic resources being designated for the assistive information associated with the plurality of data messages, wherein the assistive information is based at least in part on the first data message containing all zero bits.

Aspect 8: The method of any of aspects 1 through 6, further comprising: transmitting an uplink control information message including an indication that a first transmission occasion associated with the first set of periodic resources is skipped based at least in part on a lack of new data to be sent via the first transmission occasion and in accordance with the transmission occasion associated with the second set of periodic resources being designated for the assistive information.

Aspect 9: The method of any of aspects 1 through 6, further comprising: transmitting second assistive information associated with a second plurality of data messages via a first transmission occasion associated with the first set of periodic resources, wherein the first transmission occasion is used for the second assistive information based at least in part on a lack of new data to be sent via the first transmission occasion.

Aspect 10: The method of any of aspects 1 through 9, further comprising: receiving third information associated with a third set of periodic resources; transmitting a second plurality of data messages via a second set of transmission occasions associated with the third set of periodic resources; and transmitting second assistive information associated with the second plurality of data messages via the transmission occasion associated with the second set of periodic resources, wherein the transmission occasion is designated for the assistive information associated with the plurality of data messages and the second assistive information associated with the second plurality of data messages.

Aspect 11: The method of any of aspects 1 through 10, further comprising: receiving third information associated with a third set of periodic resources; transmitting a second plurality of data messages via a second set of transmission occasions associated with the first set of periodic resources; transmitting second assistive information associated with the second plurality of data messages via a second transmission occasion associated with the second set of periodic resources; and transmitting third assistive information associated with the assistive information and the second assistive information via a third transmission occasion associated with the third set of periodic resources, wherein the third transmission occasion is designated for the third assistive information associated with the assistive information and the second assistive information.

Aspect 12: The method of any of aspects 1 through 11, wherein the assistive information associated with the plurality of data messages is based at least in part on a bitwise operator on the plurality of data messages, wherein the assistive information includes redundant information associated with the plurality of data messages in accordance with the bitwise operator on the plurality of data messages, and an indication of a quantity of the plurality of data messages is included in the control signaling.

Aspect 13: The method of any of aspects 1 through 12, wherein a periodicity associated with the second set of periodic resources is based at least in part on a block error rate of uplink communication from the UE.

Aspect 14: The method of any of aspects 1 through 13, wherein an activation of the second set of periodic resources as assistive of the first set of periodic resources is associated with a switch to a network energy saving mode, and transmitting the assistive information associated with the plurality of data messages via the transmission occasion associated with the second set of periodic resources is based at least in part on the activation of the second set of periodic resources as assistive of the first set of periodic resources.

Aspect 15: A method for wireless communication at a network entity, comprising: transmitting control signaling that includes first information associated with a first set of periodic resources and second information associated with a second set of periodic resources; receiving a plurality of data messages via a set of transmission occasions associated with the first set of periodic resources, wherein a respective data message of the plurality of data messages is received via a respective transmission occasion of the set of transmission occasions; and receiving assistive information associated with the plurality of data messages via a transmission occasion associated with the second set of periodic resources, wherein the transmission occasion associated with the second set of periodic resources is designated for the assistive information associated with the plurality of data messages.

Aspect 16: The method of aspect 15, wherein transmitting the control signaling further comprises: transmitting, via the first information, indications of time and frequency resources and a first periodicity associated with the first set of periodic resources; and transmitting, via the second information, indications of a second periodicity and an offset associated with the second set of periodic resources, wherein the second periodicity is a multiple of the first periodicity and the offset is relative to an initial transmission occasion associated with the first set of periodic resources, and wherein the second set of periodic resources is a subset of the first set of periodic resources.

Aspect 17: The method of aspect 15, wherein transmitting the control signaling further comprises: transmitting, via the first information, indications of first time and frequency resources and a first periodicity associated with the first set of periodic resources; and transmitting, via the second information, indications of second time and frequency resources and a second periodicity associated with the second set of periodic resources, wherein the second set of periodic resources are different from the first set of periodic resources.

Aspect 18: The method of any of aspects 15 through 17, wherein transmitting the control signaling further comprises: transmitting, via the second information, an indication that the second set of periodic resources is designated as assistive of the first set of periodic resources, wherein receiving the assistive information is based at least in part on the indication.

Aspect 19: The method of any of aspects 15 through 18, further comprising: transmitting a DCI message activating the second set of periodic resources, wherein the DCI message includes an indication that the second set of periodic resources is designated as assistive of the first set of periodic resources, wherein receiving the assistive information is based at least in part on the indication.

Aspect 20: The method of any of aspects 15 through 19, further comprising: receiving a second plurality of data messages via a second set of transmission occasions associated with the first set of periodic resources; transmitting a DCI message including an indication that a second transmission occasion associated with the first set of periodic resources is designated for second assistive information associated with the second plurality of data messages; and receiving the second assistive information via the second transmission occasion based at least in part on the second transmission occasion being designated for the second assistive information.

Aspect 21: The method of any of aspects 15 through 20, wherein receiving the plurality of data messages via the set of transmission occasions associated with the first set of periodic resources further comprises: receiving a first data message containing all zero bits via a first transmission occasion of the set of transmission occasions based at least in part on a lack of new data to be sent via the first transmission occasion and in accordance with the transmission occasion associated with the second set of periodic resources being designated for the assistive information associated with the plurality of data messages, wherein the assistive information is based at least in part on the first data message containing all zero bits.

Aspect 22: The method of any of aspects 15 through 20, further comprising: receiving an uplink control information message including an indication that a first transmission occasion associated with the first set of periodic resources is skipped based at least in part on a lack of new data to be sent via the first transmission occasion and in accordance with the transmission occasion associated with the second set of periodic resources being designated for the assistive information.

Aspect 23: The method of any of aspects 15 through 20, further comprising: receiving second assistive information associated with a second plurality of data messages via a first transmission occasion associated with the first set of periodic resources, wherein the first transmission occasion is used for the second assistive information based at least in part on a lack of new data to be sent via the first transmission occasion.

Aspect 24: The method of any of aspects 15 through 23, further comprising: transmitting third information associated with a third set of periodic resources; receiving a second plurality of data messages via a second set of transmission occasions associated with the third set of periodic resources; and receiving second assistive information associated with the second plurality of data messages via the transmission occasion associated with the second set of periodic resources, wherein the transmission occasion is designated for the assistive information associated with the plurality of data messages and the second assistive information associated with the second plurality of data messages.

Aspect 25: The method of any of aspects 15 through 24, further comprising: transmitting third information associated with a third set of periodic resources; receiving a second plurality of data messages via a second set of transmission occasions associated with the first set of periodic resources; receiving second assistive information associated with the second plurality of data messages via a second transmission occasion associated with the second set of periodic resources; and receiving third assistive information associated with the assistive information and the second assistive information via a third transmission occasion associated with the third set of periodic resources, wherein the third transmission occasion is designated for the third assistive information associated with the assistive information and the second assistive information.

Aspect 26: The method of any of aspects 15 through 25, wherein the assistive information associated with the plurality of data messages is based at least in part on a bitwise operator on the plurality of data messages, wherein the assistive information includes redundant information associated with the plurality of data messages in accordance with the bitwise operator on the plurality of data messages, and an indication of a quantity of the plurality of data messages is included in the control signaling.

Aspect 27: The method of any of aspects 15 through 26, wherein a periodicity associated with the second set of periodic resources is based at least in part on a block error rate of uplink communication from a UE.

Aspect 28: The method of any of aspects 15 through 27, wherein an activation of the second set of periodic resources as assistive of the first set of periodic resources is associated with a switch to a network energy saving mode, and receiving the assistive information associated with the plurality of data messages via the transmission occasion associated with the second set of periodic resources is based at least in part on the activation of the second set of periodic resources as assistive of the first set of periodic resources.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a network entity, comprising a processor; memory coupled with the processor; and instructions stored in the memory and executable by the processor to cause the apparatus to perform a method of any of aspects 15 through 28.

Aspect 33: An apparatus for wireless communication at a network entity, comprising at least one means for performing a method of any of aspects 15 through 28.

Aspect 34: A non-transitory computer-readable medium storing code for wireless communication at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    at least one processor; and
    at least one memory coupled with the at least one processor, the at least one memory storing instructions executable by the at least one processor to cause the apparatus to:
        receive control signaling that includes first information associated with a first set of periodic resources and second information associated with a second set of periodic resources;
        transmit a plurality of data messages via a set of transmission occasions associated with the first set of periodic resources, wherein a respective data message of the plurality of data messages is transmitted via a respective transmission occasion of the set of transmission occasions;
        transmit assistive information associated with the plurality of data messages via a transmission occasion associated with the second set of periodic resources, wherein the transmission occasion associated with the second set of periodic resources is designated for the assistive information associated with the plurality of data messages;
        transmit a second plurality of data messages via a second set of transmission occasions associated with the first set of periodic resources;
        receive a downlink control information message including an indication that a second transmission occasion associated with the first set of periodic resources is designated for second assistive information associated with the second plurality of data messages; and
        transmit the second assistive information via the second transmission occasion based at least in part on the second transmission occasion being designated for the second assistive information.

2. The apparatus of claim 1, wherein the instructions to receive the control signaling are further executable by the at least one processor to cause the apparatus to:
    receive, via the first information, indications of time and frequency resources and a first periodicity associated with the first set of periodic resources; and
    receive, via the second information, indications of a second periodicity and an offset associated with the second set of periodic resources, wherein the second periodicity is a multiple of the first periodicity and the offset is relative to an initial transmission occasion associated with the first set of periodic resources, and wherein the second set of periodic resources is a subset of the first set of periodic resources.

3. The apparatus of claim 1, wherein the instructions to receive the control signaling are further executable by the at least one processor to cause the apparatus to:
    receive, via the first information, indications of first time and frequency resources and a first periodicity associated with the first set of periodic resources; and
    receive, via the second information, indications of second time and frequency resources and a second periodicity associated with the second set of periodic resources, wherein the second set of periodic resources is different from the first set of periodic resources.

4. The apparatus of claim 1, wherein the instructions to receive the control signaling are further executable by the at least one processor to cause the apparatus to:
    receive, via the second information, an indication that the second set of periodic resources is designated as assistive of the first set of periodic resources, wherein transmitting the assistive information is based at least in part on the indication that the second set of periodic resources is designated as assistive of the first set of periodic resources.

5. The apparatus of claim 1, wherein the instructions are further executable by the at least one processor to cause the apparatus to:
    receive a second downlink control information message activating the second set of periodic resources, wherein the second downlink control information message includes an indication that the second set of periodic resources is designated as assistive of the first set of periodic resources, wherein transmitting the assistive information is based at least in part on the indication that the second set of periodic resources is designated as assistive of the first set of periodic resources.

6. The apparatus of claim 1, wherein the instructions to transmit the plurality of data messages via the set of transmission occasions associated with the first set of periodic resources are further executable by the at least one processor to cause the apparatus to:
    transmit a first data message containing all zero bits via a first transmission occasion of the set of transmission occasions based at least in part on a lack of new data to be sent via the first transmission occasion and in accordance with the transmission occasion associated with the second set of periodic resources being designated for the assistive information associated with the plurality of data messages, wherein the assistive information is based at least in part on the first data message containing all zero bits.

7. The apparatus of claim 1, wherein the instructions are further executable by the at least one processor to cause the apparatus to:
transmit an uplink control information message including an indication that a first transmission occasion associated with the first set of periodic resources is skipped based at least in part on a lack of new data to be sent via the first transmission occasion and in accordance with the transmission occasion associated with the second set of periodic resources being designated for the assistive information.

8. The apparatus of claim 1, wherein the instructions are further executable by the at least one processor to cause the apparatus to:
transmit the second assistive information associated with the second plurality of data messages via a first transmission occasion associated with the first set of periodic resources, wherein the first transmission occasion is used for the second assistive information based at least in part on a lack of new data to be sent via the first transmission occasion.

9. The apparatus of claim 1, wherein the instructions are further executable by the at least one processor to cause the apparatus to:
receive third information associated with a third set of periodic resources;
transmit a third plurality of data messages via a third set of transmission occasions associated with the third set of periodic resources; and
transmit third assistive information associated with the third plurality of data messages via the transmission occasion associated with the second set of periodic resources, wherein the transmission occasion is designated for the assistive information associated with the plurality of data messages and the third assistive information associated with the third plurality of data messages.

10. The apparatus of claim 1, wherein the instructions are further executable by the at least one processor to cause the apparatus to:
receive third information associated with a third set of periodic resources;
transmit a third plurality of data messages via a third set of transmission occasions associated with the first set of periodic resources;
transmit third assistive information associated with the third plurality of data messages via a third transmission occasion associated with the second set of periodic resources; and
transmit fourth assistive information associated with the assistive information and the third assistive information via a fourth transmission occasion associated with the third set of periodic resources, wherein the fourth transmission occasion is designated for the fourth assistive information associated with the assistive information and the third assistive information.

11. The apparatus of claim 1, wherein the assistive information associated with the plurality of data messages is based at least in part on a bitwise operator on the plurality of data messages, wherein the assistive information includes redundant information associated with the plurality of data messages in accordance with the bitwise operator on the plurality of data messages, and wherein an indication of a quantity of the plurality of data messages is included in the control signaling.

12. The apparatus of claim 1, wherein a periodicity associated with the second set of periodic resources is based at least in part on a block error rate of uplink communication from the UE.

13. The apparatus of claim 1, wherein an activation of the second set of periodic resources as assistive of the first set of periodic resources is associated with a switch to a network energy saving mode, and wherein transmitting the assistive information associated with the plurality of data messages via the transmission occasion associated with the second set of periodic resources is based at least in part on the activation of the second set of periodic resources as assistive of the first set of periodic resources.

14. An apparatus for wireless communication at a network entity, comprising:
at least one processor; and
at least one memory coupled with the at least one processor, the at least one memory storing instructions executable by the at least one processor to cause the apparatus to:
transmit control signaling that includes first information associated with a first set of periodic resources and second information associated with a second set of periodic resources, wherein the instructions to transmit the control signaling are further executable by the at least one processor to cause the apparatus to:
transmit, via the first information, indications of time and frequency resources and a first periodicity associated with the first set of periodic resources; and
transmit, via the second information, indications of a second periodicity and an offset associated with the second set of periodic resources, wherein the second periodicity is a multiple of the first periodicity and the offset is relative to an initial transmission occasion associated with the first set of periodic resources, and wherein the second set of periodic resources is a subset of the first set of periodic resources;
receive a plurality of data messages via a set of transmission occasions associated with the first set of periodic resources, wherein a respective data message of the plurality of data messages is received via a respective transmission occasion of the set of transmission occasions; and
receive assistive information associated with the plurality of data messages via a transmission occasion associated with the second set of periodic resources, wherein the transmission occasion associated with the second set of periodic resources is designated for the assistive information associated with the plurality of data messages.

15. The apparatus of claim 14, wherein the instructions to transmit the control signaling are further executable by the at least one processor to cause the apparatus to:
transmit, via the second information, an indication that the second set of periodic resources is designated as assistive of the first set of periodic resources, wherein receiving the assistive information is based at least in part on the indication.

16. The apparatus of claim 14, wherein the instructions are further executable by the at least one processor to cause the apparatus to:

transmit a downlink control information message activating the second set of periodic resources, wherein the downlink control information message includes an indication that the second set of periodic resources is designated as assistive of the first set of periodic resources, wherein receiving the assistive information is based at least in part on the indication.

17. The apparatus of claim 14, wherein the instructions to receive the plurality of data messages via the set of transmission occasions associated with the first set of periodic resources are further executable by the at least one processor to cause the apparatus to:

receive a first data message containing all zero bits via a first transmission occasion of the set of transmission occasions based at least in part on a lack of new data to be sent via the first transmission occasion and in accordance with the transmission occasion associated with the second set of periodic resources being designated for the assistive information associated with the plurality of data messages, wherein the assistive information is based at least in part on the first data message containing all zero bits.

18. The apparatus of claim 14, wherein the instructions are further executable by the at least one processor to cause the apparatus to:

receive an uplink control information message including an indication that a first transmission occasion associated with the first set of periodic resources is skipped based at least in part on a lack of new data to be sent via the first transmission occasion and in accordance with the transmission occasion associated with the second set of periodic resources being designated for the assistive information.

19. A method for wireless communication at a user equipment (UE), comprising:

receiving control signaling that includes first information associated with a first set of periodic resources and second information associated with a second set of periodic resources;

transmitting a plurality of data messages via a set of transmission occasions associated with the first set of periodic resources, wherein a respective data message of the plurality of data messages is transmitted via a respective transmission occasion of the set of transmission occasions;

transmitting assistive information associated with the plurality of data messages via a transmission occasion associated with the second set of periodic resources, wherein the transmission occasion associated with the second set of periodic resources is designated for the assistive information associated with the plurality of data messages; and transmitting second assistive information associated with a second plurality of data messages via a first transmission occasion associated with the first set of periodic resources, wherein the first transmission occasion is used for the second assistive information based at least in part on a lack of new data to be sent via the first transmission occasion.

20. The method of claim 19, wherein receiving the control signaling further comprises:

receiving, via the first information, indications of time and frequency resources and a first periodicity associated with the first set of periodic resources; and receiving, via the second information, indications of a second periodicity and an offset associated with the second set of periodic resources, wherein the second periodicity is a multiple of the first periodicity and the offset is relative to an initial transmission occasion associated with the first set of periodic resources, and wherein the second set of periodic resources is a subset of the first set of periodic resources.

21. The method of claim 19, wherein receiving the control signaling further comprises:

receiving, via the first information, indications of first time and frequency resources and a first periodicity associated with the first set of periodic resources; and receiving, via the second information, indications of second time and frequency resources and a second periodicity associated with the second set of periodic resources, wherein the second set of periodic resources is different from the first set of periodic resources.

22. The method of claim 19, wherein receiving the control signaling further comprises:

receiving, via the second information, an indication that the second set of periodic resources is designated as assistive of the first set of periodic resources, wherein transmitting the assistive information is based at least in part on the indication.

23. The method of claim 19, further comprising:

receiving a downlink control information message activating the second set of periodic resources, wherein the downlink control information message includes an indication that the second set of periodic resources is designated as assistive of the first set of periodic resources, wherein transmitting the assistive information is based at least in part on the indication.

24. The method of claim 19, further comprising:

transmitting a third plurality of data messages via a second set of transmission occasions associated with the first set of periodic resources;

receiving a downlink control information message including an indication that a second transmission occasion associated with the first set of periodic resources is designated for third assistive information associated with the third plurality of data messages; and transmitting the third assistive information via the second transmission occasion based at least in part on the second transmission occasion being designated for the third assistive information.

25. A method for wireless communication at a network entity, comprising:

transmitting control signaling that includes first information associated with a first set of periodic resources and second information associated with a second set of periodic resources;

receiving a plurality of data messages via a set of transmission occasions associated with the first set of periodic resources, wherein a respective data message of the plurality of data messages is received via a respective transmission occasion of the set of transmission occasions, wherein receiving the plurality of data messages via the set of transmission occasions associated with the first set of periodic resources further comprises:

receiving a first data message containing all zero bits via a first transmission occasion of the set of transmission occasions based at least in part on a lack of new data to be sent via the first transmission occasion and in accordance with a transmission occasion associated with the second set of periodic resources being designated for assistive information associated with the plurality of data messages, wherein the assistive information is based at least in part on the first data message containing all zero bits; and receiving the assistive information associated with the plurality of data messages via the transmission occasion associated with the second set of periodic resources.

\* \* \* \* \*